US012260723B1

(12) United States Patent
Dziadulewicz et al.

(10) Patent No.: US 12,260,723 B1
(45) Date of Patent: Mar. 25, 2025

(54) INTELLIGENT AUTOMATED COMMUNITY WILDFIRE DETECTION AND SUPPRESSION CONTROL SYSTEM, AN EMBER TRAP DETECTOR, AND A HOME PERIMETER EMBER SENSOR AUTOMATED CONTROL AND ACTIVATION SYSTEM

(71) Applicants: James Gerard Dziadulewicz, Camarillo, CA (US); George Iglesias, Camarillo, CA (US); Matthew D Jenks, Sherman Oaks, CA (US); Tommy Sabre Buttner, Oak View, CA (US)

(72) Inventors: James Gerard Dziadulewicz, Camarillo, CA (US); George Iglesias, Camarillo, CA (US); Matthew D Jenks, Sherman Oaks, CA (US); Tommy Sabre Buttner, Oak View, CA (US)

(73) Assignee: Hotshot Fire Protection Systems Inc., Camarillo, CA (US)

( * ) Notice: Subject to any disclaimer, the term of this patent is extended or adjusted under 35 U.S.C. 154(b) by 917 days.

(21) Appl. No.: 17/322,698

(22) Filed: May 17, 2021

Related U.S. Application Data

(60) Provisional application No. 63/025,706, filed on May 15, 2020.

(51) Int. Cl.

| | |
|---|---|
| *G08B 17/00* | (2006.01) |
| *A62C 3/02* | (2006.01) |
| *A62C 37/44* | (2006.01) |
| *G08B 17/02* | (2006.01) |
| *G08B 17/06* | (2006.01) |
| *G08B 25/10* | (2006.01) |

(52) U.S. Cl.

CPC .......... *G08B 17/005* (2013.01); *A62C 3/0292* (2013.01); *A62C 37/44* (2013.01); *G08B 17/02* (2013.01); *G08B 17/06* (2013.01); *G08B 25/10* (2013.01)

(58) Field of Classification Search

CPC ..... A62C 3/0214; A62C 3/0271; A62C 3/292; A62C 37/36; A62C 37/44; G08B 17/005; G08B 17/02; G08B 17/06; G08B 25/10

USPC .......................................................... 169/61

See application file for complete search history.

(56) References Cited

U.S. PATENT DOCUMENTS

| | | | | |
|---|---|---|---|---|
| 5,931,233 A * | 8/1999 | La Bonte | A62C 37/40 | 169/48 |
| 7,007,910 B1 * | 3/2006 | Krinner | E04H 12/2223 | 52/165 |

(Continued)

*Primary Examiner* — Cody J Lieuwen

(74) *Attorney, Agent, or Firm* — Plager Schack LLP; Mark H. Plager, Esq.; Stephen Hallberg, Esq.

(57) ABSTRACT

An intelligent automated community wildfire detection and suppression control system, an ember trap detector, and a home perimeter ember sensor automated control and activation system are disclosed. The intelligent automated community wildfire detection and suppression control system, the ember trap detector, and the home perimeter ember sensor automated control and activation system uses unique low-cost passive and mesh-networked sensors and mechanical devices that relay data to central control systems for real-time artificial intelligence predictive software control. Wildfire control and suppression systems use this smart data for precision passive wildfire control of large areas.

10 Claims, 17 Drawing Sheets

(56) References Cited

U.S. PATENT DOCUMENTS

| | | | | |
|---|---|---|---|---|
| 8,226,017 | B2 * | 7/2012 | Cohen | A62C 3/0214<br>239/69 |
| 8,907,799 | B2 * | 12/2014 | McKenna | G08B 29/183<br>340/584 |
| 2010/0070097 | A1 * | 3/2010 | Morgenstern | A62C 35/64<br>700/283 |
| 2020/0338375 | A1 * | 10/2020 | Council | A62C 37/40 |
| 2022/0016455 | A1 * | 1/2022 | Tohidi | G06F 16/587 |

* cited by examiner

INTELLIGENT AUTOMATED COMMUNITY WILDFIRE DETECTION AND SUPPRESSION CONTROL SYSTEM, AN EMBER TRAP DETECTOR, AND A HOME PERIMETER EMBER SENSOR AUTOMATED CONTROL AND ACTIVATION SYSTEM

CLAIM OF BENEFIT TO PRIOR APPLICATION

This application claims benefit to U.S. Provisional Patent Application 63/025,706, entitled "Perimeter automated wildfire detection and control systems," filed May 15, 2020. The Provisional Patent Application 63/025,706 is incorporated herein by reference.

BACKGROUND

Embodiments of the invention described in this specification relate generally to wildfire detection and control, and more particularly, to an intelligent automated community wildfire detection and suppression control system, an ember trap detector, and a home perimeter ember sensor automated control and activation system.

Wildfires cause massive devastation to natural wildlife and human-made structures. A wildfire condition can resemble that of a cluster of low-grade nuclear explosions. That is a common visual description given to large wildfires. Miles of thick plumes of deadly toxic smoke and ash extending five miles up and covering many hundreds of square miles. Wildfires contributed six to eight times the emissions of all other industrial earth sources combined. Wildfires often have temperatures exceeding 2192° F. with 100+ MPH winds. The smoke and ash often cause mid-day daylight to turn into night. Adding to the visual disturbances, billions of large fast-moving flying embers are carried miles by the high winds created by the wildfires. Human (and other animal) health is impacted in many ways: lungs are burnt from inhaling super-heated air; carbon-monoxide poisoning occurs, smoke inhalation by people and animals, embers burning skin, people are incinerated in their cars and homes, etc. Electric power poles and cell towers burn and fall into the streets making any attempt by the fire department to help impossible. In addition, wildfires often occur in treacherous terrain which only makes it more challenging and difficult. Fire fighters have been known to flee from these conditions. A family in the middle of such an inferno is completely cut off from the world. The Woolsey fire of 2018 is a testament to the devastating effects of wildfires. The Woolsey fire burn zone covered 250 square miles of brush land cities and communities.

Although many people live in or around high wildfire severity zones, it is challenging to protect valuable structures in such areas, such as in the Santa Monica Mountains of Southern California and other places. Wildfires do not provide warnings as to when and where they will start. Night, mountainous terrain, fog, and clouds create extremely poor visibility, compounding the problem of even detecting wildfires by the smoke plumes they generate. And once a wildfire starts, it can quickly spread and endanger people, animals, structures, wildlife, and anything else in its way.

Thus, wildfires are astronomically expensive to prepare for and recover from. Technology exists to detect wildfires, such as automated smoke detection systems, expensive infrared, optical, smoke, and gas sensors, and thermal and optical detection systems. False alarms are common with automated smoke detection systems. Even the most sophisticated smoke detection algorithm will find it difficult to distinguish between clouds, fog, chimney, or camp fire smoke to even have a chance at detecting smoke plumes from a wildfire. Thus, in most situations a wildfire must be out of control before detection.

Sensor technology works reasonably well in controlled test conditions, spontaneous, real-world wildfires are another matter. For instance, existing sensors and devices cannot detect or see through such wildfire conditions. In fact, many of the existing sensors are expensive and have only a low probability in tracking a fire or providing any accurate mapping data. Such low levels of accurate sensor data make existing automated structural wildfire suppression systems gravely limited because automated wildfire suppression systems need precise three-dimensional (3D) vector data of the wildfire position, direction, and speed data in real-time to be anywhere near successful. However, none of the existing sensors or wildfire detection systems can collect precision real-time 3D vector data for utilization by automated intelligent software, 3D software mapping, and fire suppression control.

There are several notable disadvantages to expensive thermal and optical detection systems, the first of which is the line-of-sight requirement, which can be difficult to achieve, especially in very mountainous regions. As stated, clouds, fog and miles of ash filled smoke plumes and new forward spot fires will block or reduce the range of these sensors to a very short distance. They are required to be installed on expensive tall steel and concrete towers. Their power requirements are much higher as they are equipped with many expensive sensors and are separated in distances measured in miles. These long distances require expensive high power receivers and transmitters to relay their data to a central server. Even if the wildfire is surrounded with these types of sensors it would be difficult to gain valuable data other than the early phases of a wildfire. The fire can destroy or damage these sensors or the towers they are installed on, rendering them useless. False alarms are common as the sun, glare, campfires, home propane fire pits, controlled burns, fireplaces, or outdoor grills are a few example situations that can set these systems off.

Smoke and gas sensors are extremely ambiguous as data collectors. Wildfire smoke can easily travel many hundreds of miles away from the main fire line. Providing no valuable data at all. Clouds and fog can give off false alarms. Scientists still do not understand all the compounds, the ash composition, and the gases found in wildfire smoke.

Thermal sensors have notably limited ranges of typically only a few hundred meters. Optical sensors are capable of detecting fires five miles away, but only under perfect test conditions. Infrared satellites have very low initial accuracy detection and long data delays. All these methods are expensive.

Satellite infrared and optical sensor limitations on the use of wildfire detection. Earth-orbiting satellites and even air-floating devices have been employed for observation and detection of forest fires. Satellite images gathered by two main satellites launched for forest fire detection purposes, the advanced very high-resolution radiometer (AVHRR), and the moderate resolution imaging spectroradiometer (MODIS). Unfortunately, these satellites can only provide images of the regions of the earth every two days. In addition, the quality of satellite images can be affected by weather and smoke conditions.

Embers in high speed fire waves are airborne many miles before the main fires reach the structures. For instance, if a home is ten miles from a fire line and high winds are blowing embers three miles forward from the main fire line, it will only be a short time (e.g., less than thirty minutes) before these embers reach the home and, consequently, start burning the home. However, topography, natural conditions, and the wildfire itself may impact conditions to such a degree to have turned the velocity vectors of that fire in a new direction, which results in the wildfire endangering or starting to consumer another community. Thus, to gather data on fast moving wildfires that change directions spontaneously, sensors would need to be placed everywhere there is combustible material. The town of Paradise, California, was fully consumed in November 2018. In terms of an entire town or community representing combustible material, sensors would need to be placed in proximity within a 30-50 mile radius (or more) of the center of the town or community in order to even have a chance to accurately track these fast-moving wildfires.

Therefore, what is needed is a way to collect precision real-time 3D vector data for utilization by automated intelligent software and fire suppression control systems that are configured to automatically and accurately detect, track, suppress, and otherwise control wildfires in real-time.

BRIEF DESCRIPTION

An intelligent automated community wildfire detection and suppression control system, an ember trap detector, and a home perimeter ember sensor automated control and activation system are disclosed.

In some embodiments, the ember trap detector is a field ember trap detector. In some embodiments, the ember trap detector is a building vent ember suppressor. In some embodiments, the ember trap detector is a post-mounted field hard-wired ember trap detector. In some embodiments, the ember trap detector is a post-mounted wireless ember trap detector. In some embodiments, the wireless ember trap detector is deployed in a series of perimeter ember trap detectors surrounding a building structure. In some embodiments, the hardwired connections between the ember traps act as fire sensors as the above ground electrical conduit will burn and open the circuit that activates the suppression system.

In some embodiments, the ember trap detector is utilized in the home perimeter ember sensor automated control and activation system. In some embodiments, the home perimeter ember sensor automated control and activation system is utilized in the intelligent automated community wildfire detection and suppression control system.

In some embodiments, the intelligent automated community wildfire detection and suppression control system comprises a plurality of field sensors communicably connected over a mesh network. In some embodiments, the plurality of field sensors are strategically positioned to cover a large area of varying topography at approximately five field sensors per acre. In some embodiments, each field sensor is deployed as a node in the wireless mesh network of an intelligent automated community wildfire detection and suppression control system. Each field sensor is configured to transmit location and altitude data upon being activated by detection of a nearby fire. The use of a mesh network for fire data transmission vastly reduces the data communication costs. Based on aggregated data received from a minimum threshold of field sensors, a smart server generates a three-dimensional (3D) computer map that identifies dormant and activate field sensors, fire locations, and vector-based fire speed and direction. In some embodiments, the intelligent automated community wildfire detection and suppression control system uses the fire location data and the vector-based fire speed and direction data to intelligently predict future fire positions and risks in nearby areas. Based on the predicted fire risks, the intelligent automated community wildfire detection and suppression control system of some embodiments provides smart predictive fire risk warnings to fire departments and home owners in impacted and nearby areas. Furthermore, the ability of ember trap detectors to capture and detect traveling embers from a wildfire provides detailed ember conditions long before multiple fire lines race through a property and destroy or damage valuable building structures on the property. Specifically, ember trap detectors installed around building structures on a property and utilized in the home perimeter ember sensor automated control and activation system provide advance real-time smart data which enhances the 3D maps generated by the smart server. In this way, building structures at risk of fire can be pre-soaked before any of the fire lines reach the property. Similarly, building vent ember suppressors installed in building structure vents also capture and detect traveling embers, thereby providing detailed ember conditions long before fire reaches the other building structures.

In some embodiments, the home perimeter ember sensor automated control and activation system and the intelligent automated community wildfire detection and suppression control system uses unique low-cost passive and meshed networked sensors, mechanical devices that relay data to central control systems for real-time A.I. predictive software control. Unique wildfire control and suppression systems use this smart data for precision passive wildfire control of large areas.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
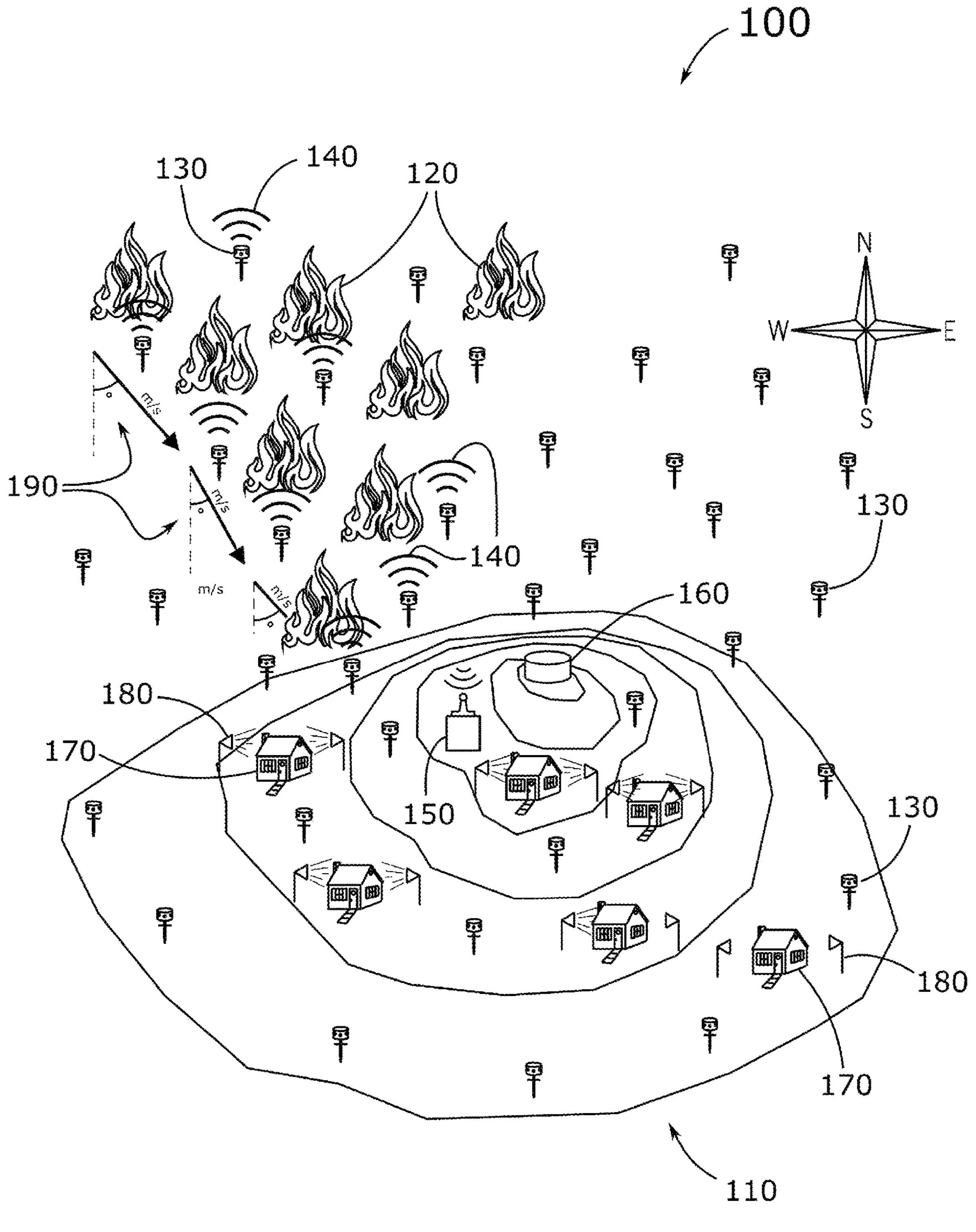
FIG. 1 conceptually illustrates a schematic diagram of an intelligent automated community wildfire detection and suppression control system in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments include a novel intelligent automated community wildfire detection and suppression control system, a novel ember trap detector, and a novel home perimeter ember sensor automated control and activation system. In some embodiments, the ember trap detector is a field ember trap detector. In some embodiments, the ember trap detector is a building vent ember suppressor. In some embodiments, the ember trap detector is a post-mounted field hard-wired ember trap detector. In some embodiments, the ember trap detector is a post-mounted wireless ember trap detector. In some embodiments, the wireless ember trap detector is deployed in a series of perimeter ember trap detectors surrounding a building structure. In some embodiments, the ember trap detector is utilized in the home perimeter ember sensor automated control and activation system. In some embodiments, the home perimeter ember sensor automated control and activation system is utilized in the intelligent automated community wildfire detection and suppression control system.

In some embodiments, the intelligent automated community wildfire detection and suppression control system comprises a plurality of field sensors communicably connected together over a mesh network. In some embodiments, the plurality of field sensors are strategically positioned to cover a large area of varying topography at approximately five field sensors per acre. In some embodiments, each field sensor is deployed as a node in the wireless mesh network of an intelligent automated community wildfire detection and suppression control system. Each field sensor is configured to transmit location and altitude data upon being activated by detection of a nearby fire. The use of a mesh network for fire data transmission vastly reduces the data communication costs. Based on aggregated data received from a minimum threshold of field sensors, a smart server generates a three-dimensional (3D) computer map that identifies dormant and activate field sensors, fire locations, and vector-based fire speed and direction. In some embodiments, the intelligent automated community wildfire detection and suppression control system uses the fire location data and the vector-based fire speed and direction data to intelligently predict fire risks in nearby areas. Based on the predicted fire risks, the intelligent automated community wildfire detection and suppression control system of some embodiments provides smart predictive fire risk warnings to fire departments and home owners in impacted and nearby areas. Furthermore, the ability of ember trap detectors to capture and detect traveling embers from a wildfire provides detailed ember conditions long before multiple fire lines race through a property and destroy or damage valuable building structures on the property. Specifically, ember trap detectors installed around building structures on a property and utilized in the home perimeter ember sensor automated control and activation system provide advance real-time smart data which enhances the 3D maps generated by the smart server. In this way, building structures at risk of fire can be pre-soaked before any of the fire lines reach the property. Similarly, building vent ember suppressors installed in building structure vents also capture and detect traveling embers, thereby providing detailed ember conditions long before fire reaches the building structure.

In some embodiments, the home perimeter ember sensor automated control and activation system and the intelligent automated community wildfire detection and suppression control system uses unique low-cost passive and meshed networked sensors, mechanical devices that relay data to central control systems for real-time A.I. predictive software control. Unique wildfire control and suppression systems use this smart data for precision passive wildfire control of large areas.

In some embodiments, the home perimeter ember sensor automated control and activation system and the intelligent automated community wildfire detection and suppression control system uses an intelligent water cannon equipped with an IR sensor that detects when part of a structure is on fire and smartly focuses the water cannon spray on a burning part of the structure for an extended period of time to smartly quench larger flames on the structure.

As stated above, the real-time automatic detection and control of wildfires. Embodiments of the intelligent automated community wildfire detection and suppression control system, the ember trap detector, and the home perimeter ember sensor automated control and activation system described in this specification solve such problems by passive and mesh-networked sensor technology and by intelligently processing real-time data by way of artificial intelligence (AI) and smart AI-based software systems to responsibly start and control wildfire protection systems. In particular, wildfires can move at rates of one mile per minute or more. Embers can quickly jump miles out in front of existing fires to ignite new fires. Conventional wildfire detection and suppression systems are sometimes used for wildfire protection. However, to date, no existing wildfire detection and suppression system or mechanism provides intelligent control of automated community wildfire suppression systems. Automation of such wildfire detection and suppression systems is essential for protecting valuable building structures and property since people are not always present at the property, people do not constantly monitor ambient air conditions around the property to look for hot traveling embers, and people often do not know the early signs of approaching fire risk. Yet, the existing sensor-based systems and other wildfire detection and suppression systems have failed to provide intelligent control of those systems. Intelligent control of automated community wildfire suppression systems relies on knowledge of the rate and direction of various fire lines. The intelligent automated community wildfire detection and suppression control system of the present disclosure solves these problems by acquiring wildfire data based on utilizing small passive low-cost off-grid solar powered mesh networked ember traps and thermal signature/infrared (IR) sensors with low-cost GPS receivers/transmitters and ember trap thermal signature sensors and IR sensors. From the acquired wildfire data, the intelligent automated community wildfire detection and suppression control system can to derive accurate real-time vector data that is utilized to generate a real-time accurate 3D vector-based map that shows active fires and provides predictive views of fire movement in real-time. As such, the accurate real-time vector data and the real-time accurate 3D vector-based map enable high-precision, intelligent control of automated wildfire suppression systems.

Embodiments of the intelligent automated community wildfire detection and suppression control system, the ember trap detector, and the home perimeter ember sensor automated control and activation system described in this specification differ from and improve upon currently existing fire detection and suppression options. Some embodiments differ by utilization of new passive and active perimeter sensors, which when deployed in a mesh network-based intelligent automated community wildfire detection and suppression control system or a home perimeter ember sensor automated control and activation system, detect wildfires in an area in real time. Furthermore, the ember trap detectors provide simple mechanical traps that sense embers and stop wildfire embers from destroying a structure. The intelligent automated community wildfire detection and suppression control system and the home perimeter ember sensor automated control and activation system are both scalable systems that can be installed for small scale homes or other small scale structures and for large scale areas, including extremely large communities covering hundreds of square miles or more.

Existing wildfire detection and suppression systems are unable to track wildfires in real-time because wildfires are, by nature, destructive and controlling events in which fire, thick smoke, wind, etc., prevent the existing wildfire detection and suppression systems from tracking the wildfires in real-time. By contrast, the intelligent automated community wildfire detection and suppression control system, the ember trap detector, and the home perimeter ember sensor automated control and activation system of the present disclosure uses unique low-cost passive and meshed networked sensors and electro/mechanical devices that relay data to central control systems for real-time AI-based predictive control. The predictive AI processing performed by the smart AI-based software systems enables generation of smart data that allows unique wildfire control and suppression systems, such as the intelligent automated community wildfire detection and suppression control system and the home perimeter ember sensor automated control and activation system, to use this smart data for precision passive wildfire control of large areas.

The intelligent automated community wildfire detection and suppression control system, the ember trap detector, and the home perimeter ember sensor automated control and activation system of the present disclosure may be comprised of the following elements. This list of possible constituent elements is intended to be exemplary only and it is not intended that this list be used to limit the intelligent automated community wildfire detection and suppression control system, the ember trap detector, and the home perimeter ember sensor automated control and activation system of the present application to just these elements. Persons having ordinary skill in the art relevant to the present disclosure may understand there to be equivalent elements that may be substituted within the present disclosure without changing the essential function or operation of the intelligent automated community wildfire detection and suppression control system, the ember trap detector, and the home perimeter ember sensor automated control and activation system.

1. Passive automated large perimeter ember sensors (or "ember trap detectors")

2. A large array of low-cost mesh-networked wildfire detection sensors (or "field sensors") that are positioned in relatively close proximity (e.g., approximately five field sensors per acre), thereby providing accurate real-time data over a particular geographical area.

3. GPS sensors (with integrated altimeters) or GPS sensors and separate altimeters that are incorporated within perimeter ember sensors, ember trap detectors, wildfire detection sensors, and field sensors to provide precision GPS location data and altitude data over varying topographies (latitude, longitude, and altitude location).

4. Ground-based ember trap temperature sensor/open circuit initiation provides passive low-cost accurate data on ember conditions for automated system activation and control (also "post-mounted ember trap detectors", "windsock ember traps", "wall-mounted ember trap detectors", etc.).

5. A real-time precision vector-based database that stores calculated vectors that indicate speed (e.g., in meters per second or m/s), direction intensity of flames, and embers of the wildfire. Each vector associated with the "location" of a corresponding reporting field or ember sensor (at the latitude, longitude, and altitude location of the corresponding sensor).

6. A virtual, real-time 3D fire map. Precision data is used to generate a clear real-time situational awareness with the virtual-3D fire map.

7. Wildfire prediction software (with predictive AI modules running in connection with the smart AI-based software systems) uses fused data to generate a virtual 3D map of the fire-lines future position (as well as the present position of the fire lines by way of the virtual, real-time 3D fire map).

8. Data sources and algorithms (such as topography algorithms, ember intensity algorithms, and others) provide enhanced ability for the smart AI-based software system to predict and make firefighting decisions that humans cannot.

9. Smart AI decision making based on the following, non-exhaustive, group of data sources. (Real-Time): Positional vector data, fire velocities, velocities on slope variations, vegetation quantities, vegetation type, vegetation moisture content, ember activity all applicable weather data. In addition, a databases on each structure in a city and its vulnerability level to wildfire.

10. Smart fused data that provides precision control of community-based fire suppression systems for each structure, with the data including at least spray volumes, spray directions, system activation, and operational times.

11. An ember concentration system that predicts and provides ember concentrations and extinguishes them long before main wildfire hits and intelligently quenching lingering hot-spots.

12. Field sensor earth screw that is configured to screw into the ground and designed to provide a strong hold once screwed in, so that wildlife or high winds cannot easily knock the field sensor down or blow it over. This also provides better solar charging exposure. A sun guard (or "sun rim") protects against sun expose that would otherwise be capable of triggering false activation of the field sensor.

13. Design can be scaled to protect a single home to exceptionally large cities.

14. Building structure risk valuation database that stores risk valuation on a per structure basis. The system assigns a unique risk valuation on a per structure basis based on location risks, surrounding vegetation, inherent qualities of the building structure, etc. Examples of building structures for risk valuation: a gas station, a school, a hospital, a parking garage, etc. These building structures (and others) would be analyzed and assigned a value, thereby allowing for intelligent adjustments of suppression systems on a per structure basis, an aggregate basis, etc.

15. Meshed networked technology is used allowing all the sensors to communicate with each other. This greatly reduced the costs of the embedded UHF transmitter. The signal only needs to travel as far as the next sensor. It makes full use of self-repairing network protocol.

16. Provide a large off-grid additional water supply system that can be connected to a town's main water line. Sensors detect when the main line water pressure drops. The smart system wirelessly activates the solar off-grid powered solenoid valve from a large gravity-fed tank that feeds into the main city's water line, allowing for no interruption in water supply while firefighting.

17. Alarm warning system. The system provides several levels of alarms to warn home owners and fire departments on the wildfire's proximity. Warning levels form when a local wild fire is detected, then validated, and then an alarm for evacuation. The alarms are configured as audible alarms by default. In some embodiments, the alarms can be reconfigured as visual alarms or device-based haptic sensation alarms. In this way, a person with hearing impairments can receive the alarms visually or by haptic movement/buzzing of a device, such as a smart phone.

18. Inter-community warning communication system. All communities with a mesh networked intelligent automated community wildfire detection and suppression control system can warn another nearby community in real-time of a pending fire and begin activation of their smart prediction intelligent automated community wildfire detection and suppression control systems.

19. False alarm guard. The intelligent automated community wildfire detection and suppression control system inherently guards against false alarms that other systems may have. For instance, the intelligent automated community wildfire detection and suppression control system provides a default "false alarm guard" configuration that requires activation of at least three sensors (and receiving respective data from each of the three) before triggering a system-wide activation signal for the system to get started. The "false alarm guard" configuration of the intelligent automated community wildfire detection and suppression control system can be re-configured to require a fewer number of activated sensors (e.g., one or two) or a greater number of activated sensors (e.g., four, five, etc.).

20. Perimeter line series of interconnected ember trap detectors. The ground-based, post-mounted, wall-mounted, windsock, and other such ember trap detectors are able to be connected together in series over a large area creating a wild-fire perimeter line. When this vast perimeter is open by heat, it trips the automated system temperature sensor/open circuit initiation provides passive low-cost accurate data on ember conditions for automated system activation and control.

21. Custom rotational spray fire suppression system. An internal fan allows multiple custom spray patterns or change the self-spray head patterns with different flows ranges and patterns. This optimizes the use of water and provides better control over structures that need protection.

22. Ground to eaves building structure soaking. Installing standard vertical lawn sprinklers in a horizontal position allows wide and precision control of structure walls and the building structure eaves.

23. Fireproof eave covers. Some embodiments provide for installation of fireproof eave covers and external eave sprays. This provides a new level of protection for building structure eaves susceptible to wildfire risk.

24. Vent ember traps. Attic vent ember traps or other building structure vent ember traps provide protection much greater than fire meshing because standard fire meshing allows small embers to enter the attic or other area of the structure and start combustion. By contrast, the vent ember traps trap the embers in a box where a mister can be activated and they burn-out and die, thereby stopping the threat.

The various elements of the intelligent automated community wildfire detection and suppression control system, the ember trap detector, and the home perimeter ember sensor automated control and activation system of the present disclosure may be related in the following exemplary fashion. It is not intended to limit the scope or nature of the relationships between the various elements and the following examples are presented as illustrative examples only.

The intelligent automated community wildfire detection and suppression control system, the ember trap detector, and the home perimeter ember sensor automated control and activation system of the present disclosure generally works by utilizing a large array of mesh networked low-cost passive ember traps and/or thermal signature sensors. These sensors are equipped with a UHF or other transmitter and receiver. A central server and modem that receives data from the sensors also ping the sensors on a regular basis for sensor health. Intelligent software generates fused data for a real-time wildfire progression map. This smart software uses the current weather conditions, winds, humidity, vegetation dryness, and wildfire topographic progression algorithms to predict the fires future position. This smart 3D map controls precisely controls the fire suppression systems in using smart software, with core AI and machine-learning modules, and a database of pre-determined structure vulnerability.

The purpose of the intelligent automated community wildfire detection and suppression control system, the ember trap detector, and the home perimeter ember sensor automated control and activation system is to end the destructive power of wildfires for homes and other structures, neighborhoods, communities, cities, and other populated areas. It does this by providing exact real-time wildfire detection, wildfire location, speed, direction, ember concentrations, and accurate prediction of where the wildfire will be in the future. This real-time data is fused by intelligent firefighting software using the sensors vector data, current weather conditions, and algorithms based on how wildfires progress across a variety of topography. This fused data supports the control of smart outdoor fire suppression systems. The real-time wildfire detection sensor system is comprised of a large array of mesh networked passive ember traps and/or thermal signature sensors. These large arrays mesh networked sensors communicate and share their data with each other. This accurate data is also transmitted via a UHF signal or other wireless signal to a central server receiver and manned control observation station. Intelligent software then performs an analysis of the unique precision vector-based sensor data. A computer combined with control electronics utilizes this data to intelligently turn on/off and control the volume locations requirements for each unique structure's suppression system.

The intelligent automated community wildfire detection and suppression control system and the home perimeter ember sensor automated control and activation system are designed to be used with water or other fire-retardant based suppression substances. A large factor in the suppression of a structure igniting due to a wildfire is the pre-control of wind-driven embers. The implementation of the intelligent automated community wildfire detection and suppression control system, the ember trap detector, and the home perimeter ember sensor automated control and activation system allows for the direction and speed of the wildfire to be determined. The ember trap sensor provides early immediate data on ember conditions. Outdoor water sprays can extinguish these dangerous embers long before and after the flames of the wildfire pass by the structures or community. Furthermore, the outdoor water sprays can quench lingering hot-spots that can restart the damaging fire.

In some embodiments of the intelligent automated community wildfire detection and suppression control system, the ember trap detector, and the home perimeter ember sensor automated control and activation system, software-based logic gates take data from all sensors. Smart software logic gates determine a unique real-time precision vector-based database including, without limitation, speed, direction, intensity of flames, and embers of the wildfire. Precision data is used to generate a clear real-time situational awareness with the virtual-3D fire map. Also, the wildfire prediction software uses fused data to generate a virtual 3D map of the fire-lines future position.

To make the intelligent automated community wildfire detection and suppression control system, the ember trap detector, and the home perimeter ember sensor automated control and activation system of the present disclosure, a person or team (e.g., a hot shot firefighting crew that normally fight wildfires in intense terrain) would plan to install a plurality of meshed networked sensors and deploy them in areas with moderate or high risk. These sensors would be quickly installing by a hotshot crew under calm temperate conditions. Helicopters used to support wildfires could drop of additional packages of sensors as the crew progress along the remote terrain. Those areas may be fully cut off from the world with no city power communications, no water, and no way to accurately gauge where fire are is located or where the fire is heading. Embodiments of the intelligent automated community wildfire detection and suppression control system and the home perimeter ember sensor automated control and activation system do not rely on an undefined number of expensive inaccurate long-range sensors that have high power requirements and need to be installed on steel towers with heights of ten to one-hundred feet. To install and deploy, therefore, a hot shot crew would identify and provide a backup water supply to a main water line of a city or region. A large gravity fed water storage tank can be connected to this main water line. A large gravity fed water storage tank can store water for many years avoiding water shortages during drought conditions. This is a very environmentally sound solution. A river can feed water as a backup water supply to the main water line. The hot shot crew would configure the intelligent automated community wildfire detection and suppression control system and the home perimeter ember sensor automated control and activation system to detect or sense low water pressure in the main water line, or read a water pressure value and identify when the water pressure value is a low pressure value for the main water line. The hot shot crew would also install and deploy smart wireless activated solenoid that would be configured to open when needed (e.g., low water pressure is detected in the city main water line), thereby providing uninterrupted water pressure for combating wildfires. The hot shot crew would perform sensor installation of field sensors and ember trap detectors and configure them as nodes in a mesh network. Sensor placement averages about one sensor every five hundred feet, but can be acceptable at one sensor every two hundred feet or lower spacing. The quantity of these sensors per acre will vary depending on topography and amount of vegetation. It would take approximately 3 to 5 days and 300 people from California's hot shot crews to place enough mesh networked ground sensors to cover the Malibu Woolsey wildfire area. While the field sensor and ember trap detection installation is a human task performed by the hot shot crew or other group of workers, the establishment of the mesh network could be handled by one or a few of the crew or by a specialized network administrator. The mesh network would connect the sensor nodes together for interconnected communication and install/deploy modems, routers, wireless routers, and other networking and communications hardware as needed. At least one server computing device, and possibly several additional servers, would be installed and configured to connect the mesh network sensor nodes and networking/communication hardware devices together, and in some cases, interconnect with other mesh networks established in other cities, jurisdictions, areas, communities, etc.

In some embodiments, the intelligent automated community wildfire detection and suppression control system, the ember trap detector, and the home perimeter ember sensor automated control and activation system uses mass-produced low-cost mesh network technology which allows placement of many hundreds of thousands of off-grid solar powered thermal signature/infrared (IR) sensors and local Ultra-High-Frequency (UHF) transmitters or other wireless signals in a tightly packed array. Placement averages about one sensor every two hundred feet. The quantity of these light sensors per acre will vary depending on topography and amount of vegetation. For example, given 300 people in an area, an intelligent automated community wildfire detection and suppression control system and home perimeter ember sensor automated control and activation systems with ember trap detectors could be installed by personnel as few as 14 hot shot crews out 28% of California's crews who could place enough mesh networked ground sensors to cover the Malibu Woolsey wildfire area in approximately three to five days. Hotshot crews can log each meshed networked sensors, long and altitude that correspond to each sensor unique network ID. This provides a low-cost alternative to GPS locator sensor.

In some embodiments of the intelligent automated community wildfire detection and suppression control system, the ember trap detector, and the home perimeter ember sensor automated control and activation system, the IR sensors are installed in connection with GPS locator sensors and altimeter sensors, such that a GPS locator sensor that corresponds to one or more IR sensors in an ember trap detector would transmit exact latitudes and longitudes of those IR sensors, while a corresponding altimeter sensor would transmit altitudes of the IR sensors. Also, it is possible to utilize combined GPS/altimeter sensors for the same purpose. In this way, the intelligent automated community wildfire detection and suppression control system and the home perimeter ember sensor automated control and activation system are designed to provide extremely accurate real-time wildfire location, direction, and speed.

In some embodiments, the meshed networked technology greatly reduces the need for more expensive UHF transmitters as the signal only needs to travel as far as the next sensor. This large array also allows for system redundancy and prevents false alarms, such as when other sensors get triggered by campfires, glare, clouds, or the sun. By contrast, the ember trap detector of the present disclosure incorporates a sun rim to prevent this.

For connectivity and data transmission, the intelligent automated community wildfire detection and suppression control system and the home perimeter ember sensor automated control and activation system would include a central server system comprising at least one central server or a series of local off-grid central servers and modems. Once set up, they could be networked together with the components of the intelligent automated community wildfire detection and suppression control system, the ember trap detector, and the home perimeter ember sensor automated control and activation system, such as in a mesh network. In some embodiments, a satellite link is set-up as a back-up data system. In some embodiments, the central server system would do a regular ping to determine the health of all the sensors for possible replacement also pings the sensors.

The intelligent automated community wildfire detection and suppression control system and the home perimeter ember sensor automated control and activation system are fully scalable. The more components and methods of the intelligent automated community wildfire detection and suppression control system, the ember trap detector, and the home perimeter ember sensor automated control and activation system that are incorporated into final deployments and different implementations, the greater the protection from wildfires.

The purpose of the intelligent automated community wildfire detection and suppression control system, the ember trap detector, and the home perimeter ember sensor automated control and activation system of the present disclosure is ending the destructive power of wildfires for homes, communities, and cities. It does this by providing exact real-time wildfire detection, wildfire location, speed, direction, ember concentrations and accurate prediction of where the wildfire will be in the future. This real-time data is fused by automated intelligent firefighting software and suppression systems using the sensor's vector data, current weather conditions and algorithms based on how wildfires progress across a variety of topography. This fused data supports the control of smart outdoor fire suppression systems. The real-time wildfire detection sensor system is comprised of large array of mesh networked passive ember traps and or Thermal Signature sensors. These large array mesh networked sensors communicate and share their data with each other. This accurate data is also transmitted via a wireless or UHF signal to a central server receiver. Intelligent software then performs analysis of the unique precision vector-based sensor data. A computer combined with control electronics utilizes this data to intelligently turn on/off and control the volume, locations requirements for each unique structure. The system is designed to be used with water or other fire-retardant based suppression substances. A large factor in the suppression of a structure igniting due to a wildfire is pre-control of wind driven embers. This design knows the direction and speed that the wildfire is going. Our ember trap sensor provide early immediate data on ember conditions. Outdoor water sprays can extinguish these dangerous embers long before and after the flames of the wildfire pass by the structures or community. Quenching lingering hot spots that can restart damaging fire. The sensors use stored power from a battery energized by small solar panels or are hardwire to the homes back-up power grid. These sensors have a specific earth screw design to ensure a strong hold into the ground for stability during high winds. Placement will provide for availability of solar sun charging energy and acquisition of IR Thermal Signature from a wildfire. Each sensor is placed with a known GPS location ID code. This ID code is based on latitude, longitude, and altitude. The specific location ID code for each sensor transmitter is entered and logged (stored in a database). Placement is based on the topography surrounding a structure or a large community and risk values assigned (and stored in the risk valuation database) to a wide variety of different structures. However, because wildfires not only generate vast losses in property but also in life, it is not the purpose of the intelligent automated community wildfire detection and suppression control system, the ember trap detector, and the home perimeter ember sensor automated control and activation system to rely only on risk values assigned to the different building structures in danger of wildfire damage. Remote homes, communities, and cities are all at risk. Thus, the intelligent automated community wildfire detection and suppression control system, the ember trap detector, and the home perimeter ember sensor automated control and activation system of the present disclosure is designed to be scalable to protect a single structure and up to exceptionally large communities and cities. Furthermore, the intelligent automated community wildfire detection and suppression control system, the ember trap detector, and the home perimeter ember sensor automated control and activation system can use any safe off-grid power supply, any off-grid stored/additional water source (or river flow, natural water sources), and works with a variety of local wireless communication technologies. In some cases, the mesh networking communication technology is based on Zigbee type wireless communication protocols, but not limited in that way. Also, while the intelligent automated community wildfire detection and suppression control system and the home perimeter ember sensor automated control and activation system are designed to be automatically activated (e.g., upon activation of three field sensors that detect fire), they can be started via other methods including, without limitation, manually switched on via notification from home security cameras connected to a satellite internet, remotely via an off-grid satellite link, and via smartphone application. In a preferred embodiment, the smartphone application is a preferred start for the fully automated intelligent automated community wildfire detection and suppression control system and the home perimeter ember sensor automated control and activation system of the present disclosure.

By way of example, FIG. 1 conceptually illustrates a schematic diagram of an intelligent automated community wildfire detection and suppression control system 100 in some embodiments. As shown in this figure, an intelligent automated community wildfire detection and suppression control system 100 is installed and deployed for use in a community 110 with varying topography. As demonstrated by several small fires 120, the community 110 may be in a fire zone which can benefit from automated and intelligent real-time vector-based wildfire detection. The intelligent automated community wildfire detection and suppression control system 100 shown in this figure includes several field sensors 130 with receivers/transmitters to send and receive wireless signals 140 when communicably connected together in a mesh network for data transmission between different field sensors 130 and hardware computing and communication devices including at least a system control house 150. In addition to receivers/transmitters, the field sensors 130 include small 360° field of view infrared (IR) sensors. The 360° field of view IR sensors are aligned as a circular array of several IR sensors. Examples of a field sensor and a 360° field of view IR sensor array are described below, by reference to FIGS. 2 and 3.

The system control house 150 is an off-grid central signal receiving and transmission house that provides intelligent automatic control of the community wildfire detection and suppression control system 100. Specifically, the system control house 150 comprises an intelligent fire suppression server with smart control software (that includes predictive AI modules and smart algorithms of varied data sources associated with the smart AI-based software system), a receiver/transmitter, a satellite modem, an off-grid generator/power, and fire suppression hardware including one or more smart variable flow volume valves and ON/OFF activation water solenoid valves, and other fire suppression hardware.

The intelligent automated community wildfire detection and suppression control system 100 shown in this figure also includes a backup water storage supply 160, several building structures 170, several fire suppressors 180, and several velocity and direction vectors 190. The backup water storage supply 160 in this figure is a gravity fed or off-grid stored water supply.

In this figure, some of the field sensors 130 are shown as transmitting sensor signals 140 while other field sensors 130 are not. The field sensors 130 transmitting the wireless data signals 140 indicate that they have been activated by detection of fire. By contrast, the field sensors 130 which are not sending signals 140 remain in a dormant state. The data being transmitted via the wireless signals 140 from the activated field sensors 130 includes the location ID code of the respective field sensor 130. The location ID code provides an exact location of the field sensor 130, as it is comprises of the particular coordinates for latitude and longitude and altitude measurement of the field sensor 130. The field sensor 130 data is transmitted at least to the system control house 150 for analysis and processing to derive velocity and direction vectors 190 that allow for predictive AI processing of fire-line paths over a range of future time. When those vectors are computed and predictions of fire-lines can be made, a virtual 3D map is generated showing the predicted paths of fire lines and levels of danger, which also triggers various fire suppression electro/hardware systems to activate in order to pre-soak or combat active fire.

Thus, when combined and operating, the components of the intelligent automated community wildfire detection and suppression control system 100 provides a valuable community-based smart wildfire suppression system that avoids false alarms. For example, when a field sensor 130 detects a wildfire heat source, the field sensor 130 automatically activates and transmits a message via wireless signal 140 indicating its exact position (i.e., location ID code) through the meshed network of field sensors 130 to the system control house 150 for processing and prediction. Depending on the false alarm guard configuration, a level one warning may be transmitted to homeowners and the local fire-department that a fire has been detected by one (or by three if so set) field sensors that are within relatively close proximity.

Figure 2:
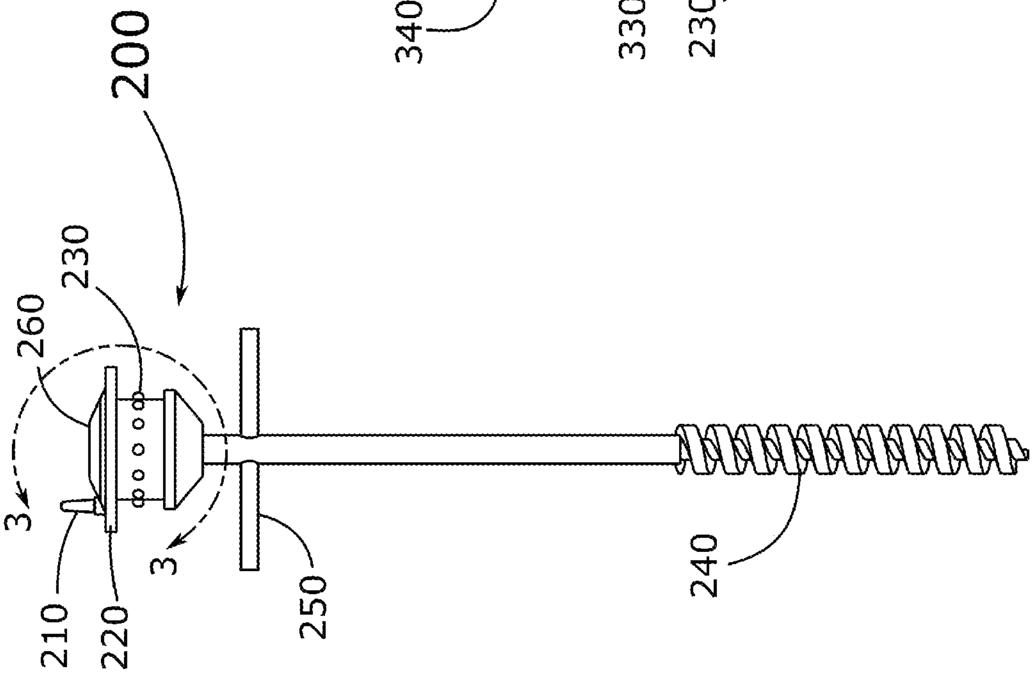
FIG. 2 conceptually illustrates a side elevation view of a low-cost short-range field mesh networked thermal signature sensor used in a community-based intelligent automated community wildfire detection and suppression control system in some embodiments.

By way of example, FIG. 2 conceptually illustrates a side elevation view of a field sensor used in a community-based intelligent automated community wildfire detection and suppression control system in some embodiments. The field sensor shown in this figure is a wind-proof earth-screwed 360° infrared (IR) solar-powered mesh wildfire sensor 200. The wind-proof earth-screwed 360° IR solar-powered mesh wildfire sensor 200 in this example is approximately 1½ feet in height. However, it is noted that the field sensors described in the present disclosure are scalable according to need or design. The sensor can detect direct short-range Thermal Signature or IR radiation. The wind-proof earth-screws 360° IR solar-powered mesh wildfire sensor 200 is comprised of a receiver/transmitter 210, a sun blocking rim 220, a plurality of IR sensors 230, a ground earth screw 240, a removable torque handle 250, and a small solar panel cap 260 that captures sunlight to convert into electricity to power the wind-proof earth-screwed 360° IR solar-powered mesh wildfire sensor 200.

The receiver/transmitter 210 is for wireless communication over the mesh network. The sun rim 220 protects the IR sensors 230 from exposure to sunlight which could needlessly trigger an IR sensor. Smart sun location software would employ algorithms to note the angle of the sun and add the additional verification requirements for the time of day. The plurality of IR sensors 230 are aligned in a circular IR sensor array that surrounds a head component of the field sensor under the sun rim 220. The ground earth screw 240 is designed to screw into the ground at a depth which effectively prevents accidental tipping over by animals or wind. The removable torque handle 250 allows easy installation and removal of the wind-proof earth-screwed 360° IR solar-powered mesh wildfire sensor 200. Specifically, the removable torque handle 250 allows a hot shot crew member or other installation personnel to screw the wind-proof earth quickly and easily screwed 360° IR solar-powered mesh wildfire sensor 200 into the earth, regardless of the condition of the underlying ground soil (hard, soft, mixed with pebbles and rocks, mixed with roots, etc.). Also, the torque handle 250 is removable to prevent (or make difficult) unscrewing of the wind-proof earth-screwed 360° IR solar-powered mesh wildfire sensor 200 by nefarious or ignorant actors. The meshed network sensor will also be colored to camouflage it to blend in with the natural surroundings. In addition, if a sensor is removed the central server will be notified of the missing sensor for replacement. In this way, a high level of confidence is associated with the location ID code that is determined and logged (stored) upon installation of the wind-proof earth-screwed 360° IR solar-powered mesh wildfire sensor 200 since it is considerably difficult to unscrew without other tools. Also, if and when any wind-proof earth-screwed 360° IR solar-powered mesh wildfire sensor 200 needs to be moved to a new location, a hot shot crew member or other personnel need not have the removable torque handle 250 that was used for this particular wind-proof earth-screwed 360° IR solar-powered mesh wildfire sensor 200, since the removable torque handle 250 of any other wind-proof earth-screwed 360° IR solar-powered mesh wildfire sensor 200 installed in the mesh network of the intelligent automated community wildfire detection and suppression control system 100 would suffice to unscrew and relocate the particular wind-proof earth-screwed 360° IR solar-powered mesh wildfire sensor 200.

Figure 3:
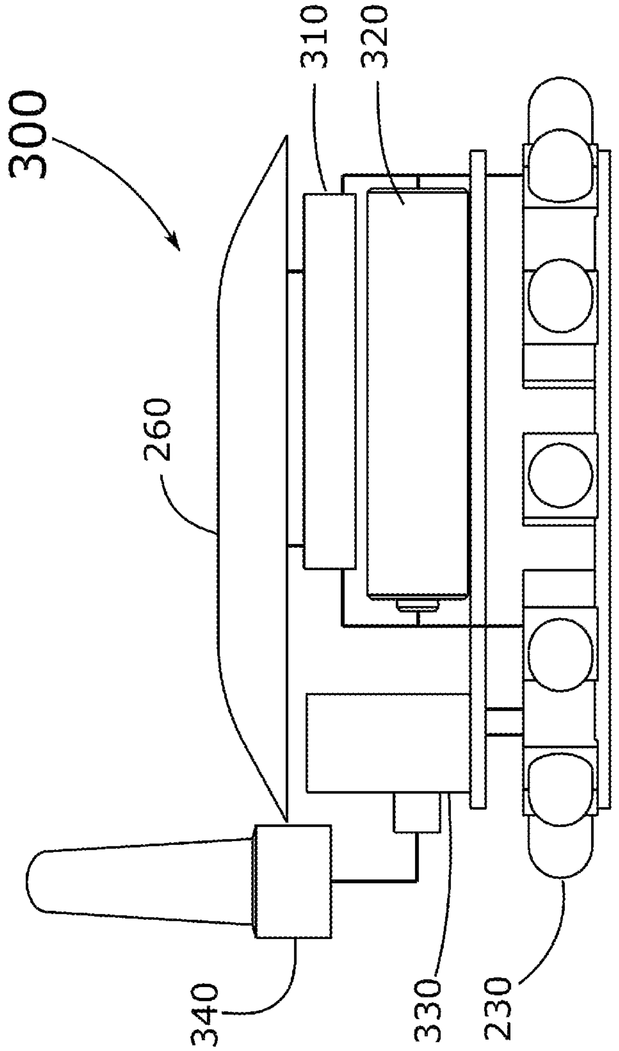
FIG. 3 conceptually illustrates a detail elevation view, taken along line 3-3 in FIG. 2, of the field sensor used in the community-based intelligent automated community wildfire detection and suppression control system in some embodiments.

FIG. 3 conceptually illustrates a detail elevation view, taken along line 3-3 in FIG. 2, of the wind-proof earth-screwed 360° IR solar-powered mesh wildfire sensor used in the community-based intelligent automated community wildfire detection and suppression control system in some embodiments. The detail elevation view 300 shows neither the sun rim 220 nor the external surface of the head of the wind-proof earth-screwed 360° IR solar-powered mesh wildfire sensor 200 shown in FIG. 2. Instead, the detail elevation view 300 of this figure shows internal components of the wind-proof earth-screwed 360° IR solar-powered mesh wildfire sensor including a charge controller 310, rechargeable battery 320, a mesh network controller 330, and a short range ultra high frequency (UHF) transmitter antenna 340, as well as the plurality of IR sensors 230 and the small solar panel cap 260. As shown, the rechargeable battery 320 is connected to the charge controller 310, which itself is directly connected to the small solar panel cap 260. This allows the electricity converted from the sunlight captured by the small solar panel cap 260 to be provided to the charge controller 310 to charge the rechargeable battery 320 when needed.

Also, the receiver/transmitter 210 for wireless communication over the mesh network, described above by reference to FIG. 2, is shown in this figure to involve both the mesh network controller 330 and the short range UHF transmitter antenna 340. By combining the short range UHF transmitter antenna 340 with the mesh network controller 330, the amount of power needed to transmit the signals of the field sensor is greatly diminished since the nearest mesh network node is determined by the mesh network controller 340 to minimize the signal strength required for transmission. In some embodiments, the mesh network controller 340 determines the nearest other field sensor by sending minimal data packets of ping data to field sensors that are configured to be nearby nodes in the mesh network to its own field sensor node in the mesh network. In this way, if or when a field sensor is inoperative or otherwise incommunicado, the mesh network controller 330 can search for the next nearest field sensor and direct the short range UHF transmitter antenna 340 to transmit the signal data to the next nearest field sensor when found.

Figure 4:
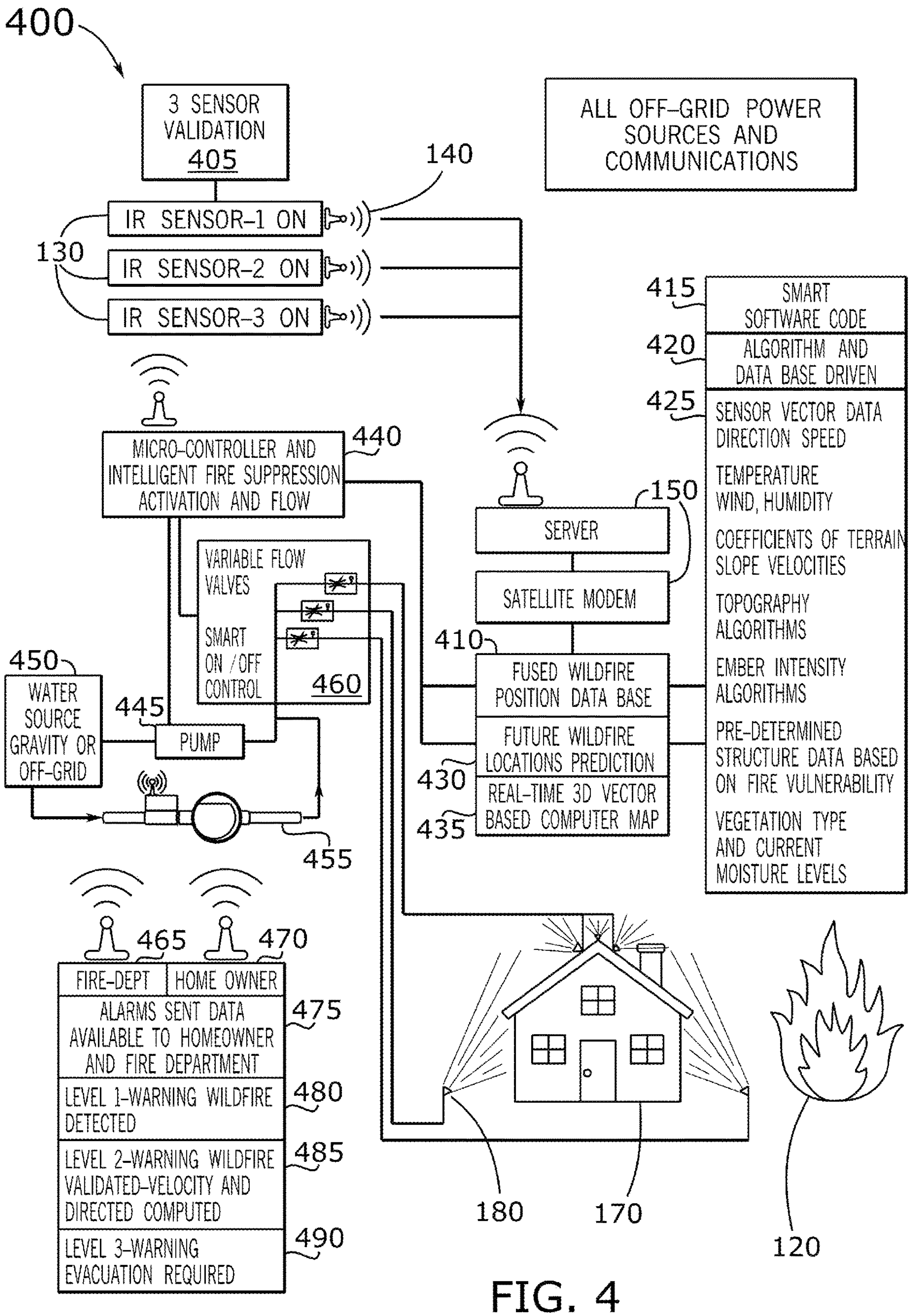
FIG. 4 conceptually illustrates a community-based intelligent automated community wildfire detection and suppression control process in some embodiments.

Now turning to an example of a flow chart that demonstrates a process by which the components of the intelligent automated community wildfire detection and suppression control system work together to detect and suppress wildfires and protect valuable building structures in communities or other geographical areas. Specifically, FIG. 4 conceptually illustrates a community-based intelligent automated community wildfire detection and suppression control process 400 in some embodiments. As shown in this figure, the community-based intelligent automated community wildfire detection and suppression control process 400 is configured (by way of the false alarm guard setting) to start upon three sensor validation (at 405). In this case, three IR sensors 130 (a first IR sensor-1, a second IR sensor-2, and a third IR sensor-3) have been activated as shown by the wireless signals 140 being transmitted to the receiver/transmitter of the system control house 150 which channels the wireless signal 140 data, including the location ID code of each IR sensor 130 and other data related to the detected wildfire, to the intelligent fire suppression server of the system control house 150 for processing as fused wildfire position data by the smart control software. The intelligent fire suppression server stores the fused wildfire position data in a fused wildfire position database (at 410). The smart software code (at 415) of the smart control software processes the fused wildfire position data in connection with algorithms and database source data (at 420) to calculate velocity and direction vectors, use temperature, wind, and humidity data, use pre-determined coefficients of fire propagation on various terrain slope. Velocities using combined wind, topography algorithms and other data, process data via ember intensity algorithms, identify existing building structures and valuations of the existing building structures by the pre-determined structure data based on fire vulnerability, and consider the impact of vegetation types and current moisture levels (at 425), among other algorithms and data sources.

In some embodiments, after processing the data by the smart software code (at 415) of the smart control software, the community-based intelligent automated community wildfire detection and suppression control process 400 predicts future wildfire locations (at 430) and generates a real-time 3D vector-based computer map (at 435) of the present fire lines of the wildfire(s) and future/predicted path of the wildfire(s).

Figure 5:
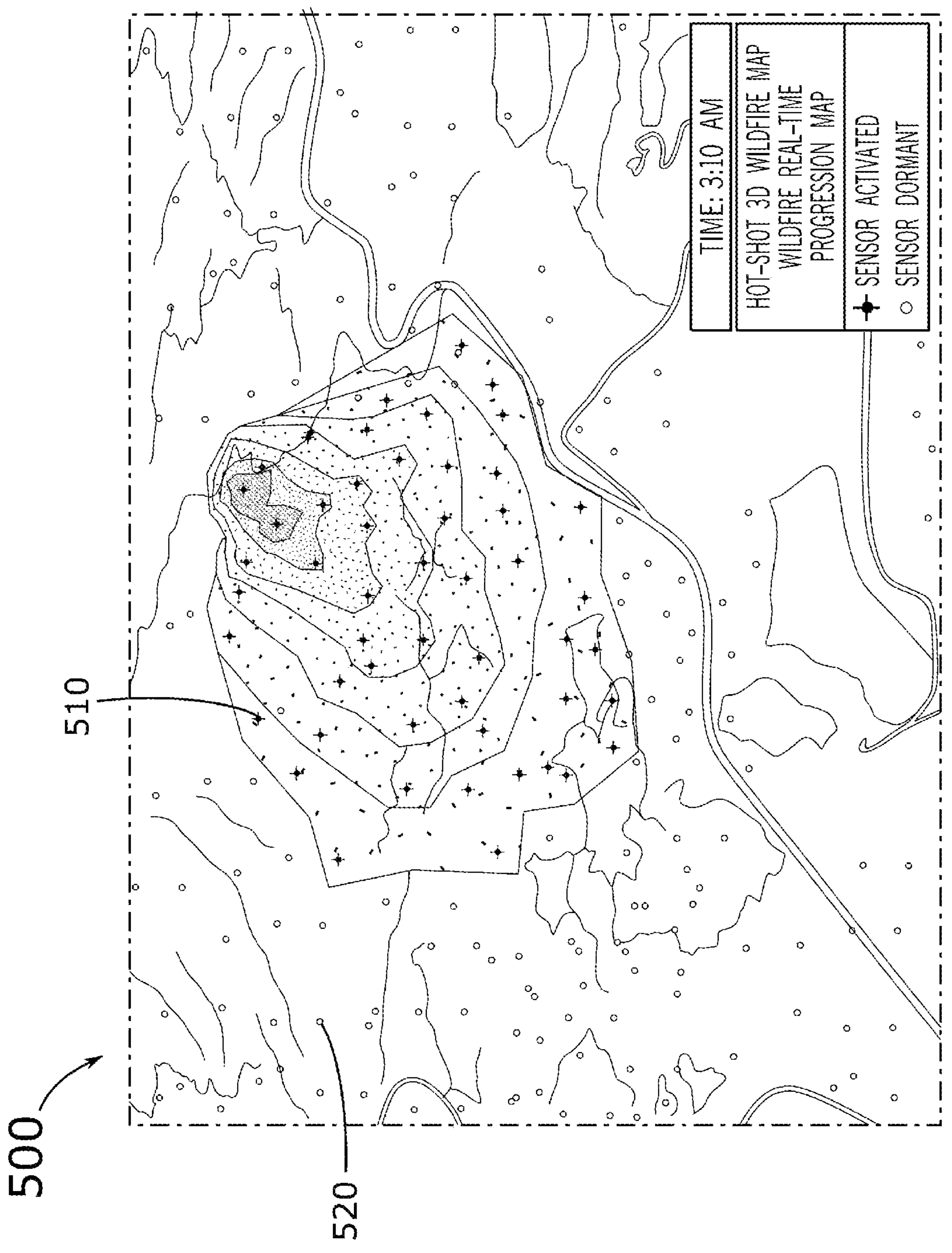
FIG. 5 conceptually illustrates a real-time 3D wildfire mapping display that is visually output onto a screen of a computing device in some embodiments.

Turning to FIG. 5, an example of a real-time 3D vector-based computer map is shown. Specifically, FIG. 5 conceptually illustrates a real-time 3D wildfire mapping display 500 that is visually output onto a screen of a computing device in some embodiments. The screen of the computing device can be a touchscreen of a mobile device of a homeowner, or a computer monitor at a central Hotshot control station or fire department. In this view, the real-time 3D wildfire mapping display 500 shows several activated field sensor graphic elements 510, based on the location ID codes of these activated field sensors that are spread over a region with varying topography. The real-time 3D wildfire mapping display 500 also demonstrates several dormant field sensor graphic elements 520 which are not near any of the fire lines currently being reviewed. This 3D wildfire mapping system application will be used to support smart predictive future fire line positions.

Now turning back to FIG. 4, the community-based intelligent automated community wildfire detection and suppression control process 400 of some embodiments proceeds to a next stage to perform an intelligent fire suppression activation and flow, by way of a micro-controller (at 440). In some embodiments, a water pump is triggered to activate (at 445) when present. The water pump can tap a water source, such as a gravity-fed backup water storage supply or some other off-grid backup water supply (at 450) when an automated water control system that links to a city water system detects low water pressure (at 455). An example of an automated water control system that links to a city water system is described further below, by reference to FIG. 7. On the other hand, an open circuit intelligent fire suppression activation and flow may be determined by the micro-controller. In that case, the community-based intelligent automated community wildfire detection and suppression control process 400 connected to suppression pumps (at 445) and proceeds directly to the smart variable flow volume valves and ON/OFF activation water solenoid valves which proceeds to trigger the fire suppressors 180 of a build structure 170 when the water pressure is sufficient.

In some embodiments, the intelligent fire suppression server of the system control house 150 transmits, by way of the off-grid satellite and satellite modem, the wildfire alarm warnings to fire department(s) (at 465) and home owners (at 470). In some embodiments, the intelligent fire suppression server of the system control house 150 also transmits, by way of the off-grid satellite and satellite modem, the future wildfire locations (at 430) and the real-time 3D vector-based computer map (at 435) of the present fire lines of the wildfire(s) and future/predicted path of the wildfire(s) to the fire department(s) (at 465) and home owners (at 470). In some embodiments, the alarm warnings are based on different levels of risk, and the alarms are sent along with other data to the fire department(s) and home owners (at 475). The alarm warnings based on different risk levels include a Level-1 warning (at 480) when an initial wildfire is detected, a Level-2 warning (at 485) when the wildfire is validated (e.g., by confirmation of three activated field sensors), in which case the velocity and direction vectors are computed (allowing future wildfire positions to be computed), and a Level-3 warning (at 490) when the wildfire poses a danger to occupants and immediate evacuation is required. In this way, home owners and fire departments can get the warnings that apply to their location and monitor the wildfire 3D progression map on a computer or a smartphone, thereby informing them of decisions that may need to be made or actions that may be required.

Figure 6:
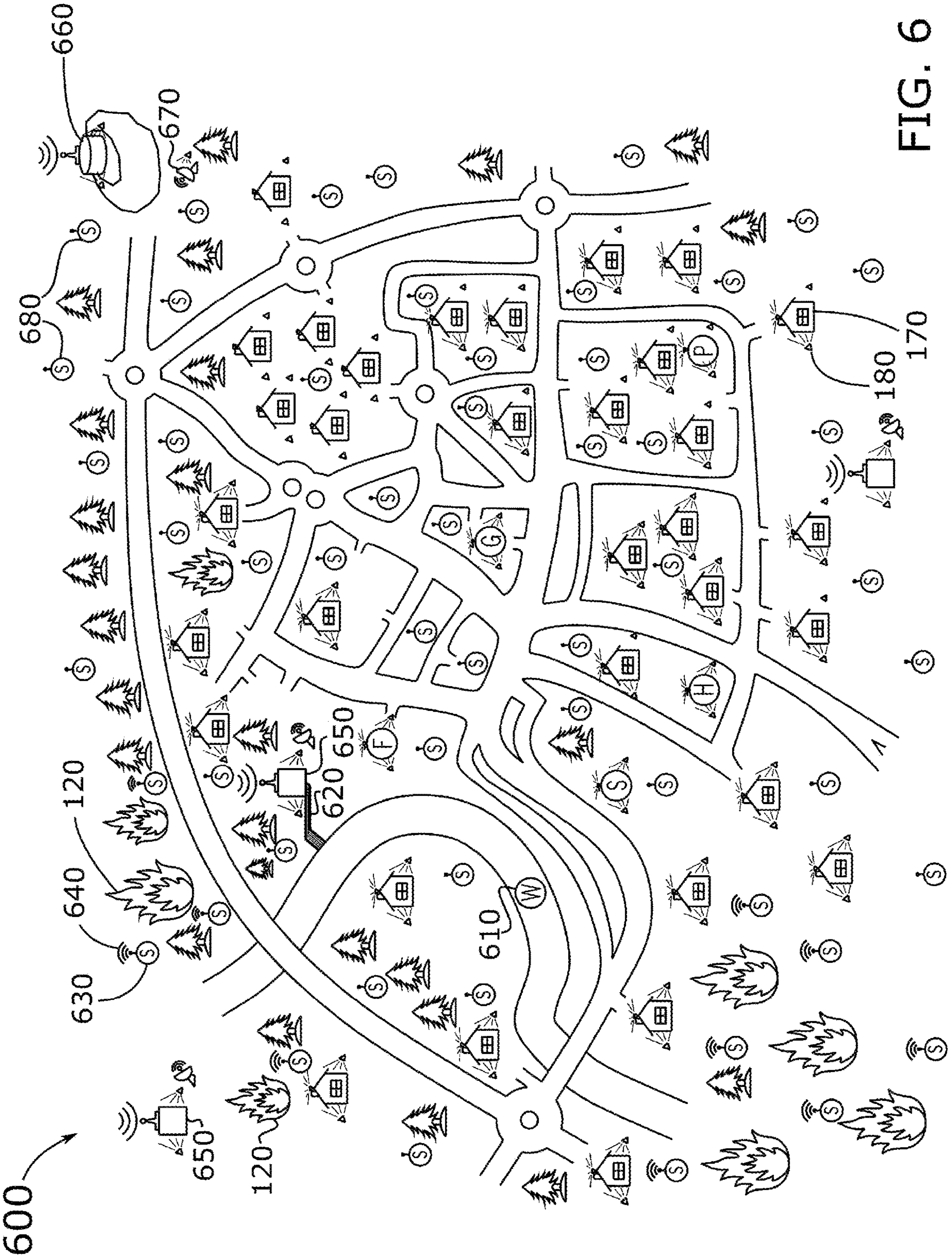
FIG. 6 conceptually illustrates a schematic view of a larger community mesh network-based intelligent automated community wildfire detection and suppression control system deployed for a city in some embodiments.

By way of example, FIG. 6 conceptually illustrates a schematic view of a community-based intelligent automated community wildfire detection and suppression control system deployed for a city 600 in some embodiments. As shown in this figure, several small fires 120 are present at the outskirts of the city which has several building structures 170 with fire suppression systems 180. In this case, the city is covered by the community-based intelligent automated community wildfire detection and suppression control system deployed for the city 600. In its current deployment for the city, the community-based intelligent automated community wildfire detection and suppression control system deployed for the city 600 includes a local river backup water supply 610, a variable irrigation pump system 620, a plurality of active sensors 630 that close enough to the small fires 120 (no more than 100 feet away) to trigger communication via active sensor signals 640, a plurality of system control houses 650, a secondary gravity-fed water storage supply 660, an off-grid satellite communication relay 670, and a plurality of dormant (inactive) sensors 680.

The system control houses 650 shown in this figure include an intelligent fire suppression server with smart control software, a receiver/transmitter, a satellite modem, an off-grid generator/power, smart variable flow volume valves and ON/OFF activation water solenoid valves, and other fire suppression hardware. One of the system control houses 650 shown in this figure is connected to variable irrigation pump system 620 that taps a backup water supply from the local river, such as when the city main water line pressure is determined to be too low. Another water supply is available by way of the secondary gravity-fed water storage supply 660, which is triggered to provide the gravity-fed after supply by way of the off-grid satellite communication relay 670, this can be used as the primary suppression water source or when the city main line water pressure is measured to be too low.

Figure 7:
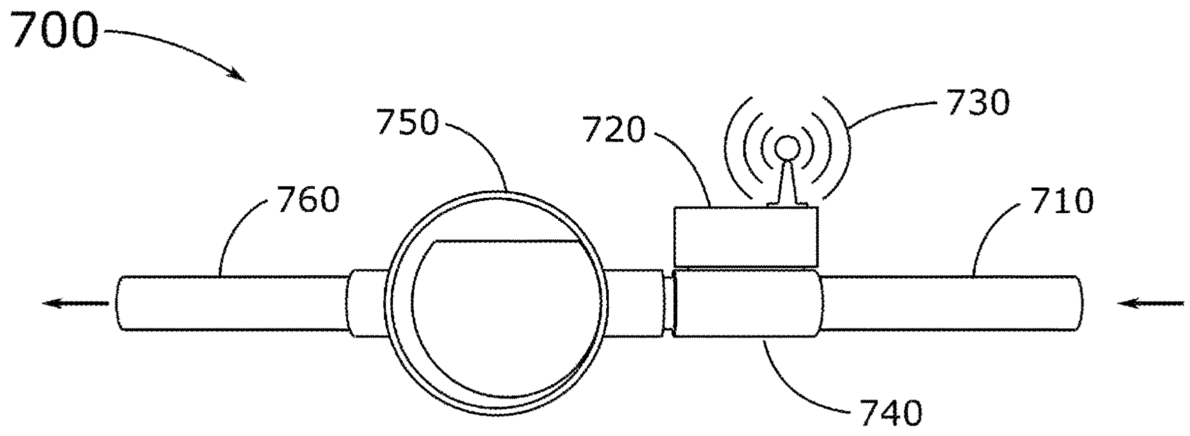
FIG. 7 conceptually illustrates an activation system for a city water supply used in connection with the community-based intelligent automated community wildfire detection and suppression control system deployed for the city in some embodiments.

By way of example, FIG. 7 conceptually illustrates an activation system for a city water supply 700 used in connection with the community-based intelligent automated community wildfire detection and suppression control system deployed for the city in some embodiments. As shown in this figure, the activation system for the city water supply 700 includes a source line 710 from an off-grid water source (or "primary/additional water supply"), an off-grid solenoid 720 that opens the water supply, via a satellite receiver 730 for the water supply solenoid, a tank water supply line valve 740 from the off-grid water source, a city main water line 750, and a main water line to a building structure 760. A large off-grid water supply system would need to be provided that can be connected to a town's main water line. Then, when sensors detect the main line water pressure drops, the community-based intelligent automated community wildfire detection and suppression control system can open the additional water supply. Specifically, the community-based intelligent automated community wildfire detection and suppression control system of some embodiments wirelessly transmits a signal to the satellite receiver 730 to activate the off-grid solenoid 720 and open the additional water supply line valve 740 that provides water supply from the off-grid water source. The off-grid water source may be, for example, a large gravity-fed tank that feeds into the main city's water line. In this way, the activation system for the city water supply 700 provides a way to ensure there are no interruptions in water supply while firefighting.

Figure 8:
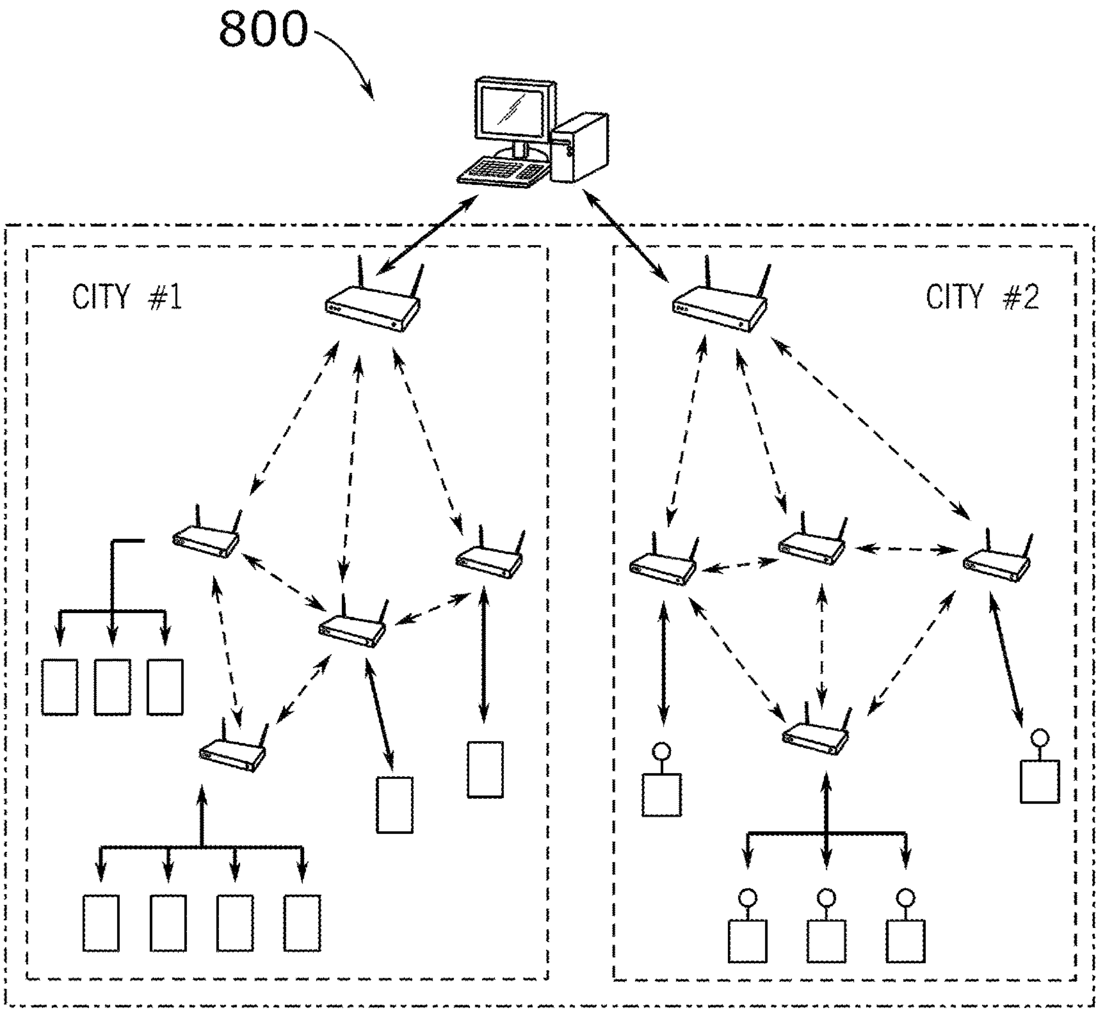
FIG. 8 conceptually illustrates an automated wireless mesh network system with a central control station that supports a low to high number of nodes and is configured for communication over a community-based intelligent automated community wildfire detection and suppression control system in some embodiments.

In another example, FIG. 8 conceptually illustrates an automated wireless mesh network system 800 that supports a low to high number of nodes and is configured for communication over community-based intelligent automated community wildfire detection and suppression control systems deployed in different cities (or communities). As shown in this figure, a series of local off-grid central servers and modems would be set up. A satellite link would be set-up as a back-up data system. The central server system would do a regular ping to determine the health of all the sensors for possible replacement also pings the sensors on a regular basis for sensor health and for replacement. Each leaf or end node would have a specific ID code that corresponds to a location (e.g., a GPS location) and an altitude (for regions with varying topographies).

The automated wireless mesh network system 800 provides extremely accurate real-time wildfire location, direction and speed. The mesh networking technology greatly reduces the need for more expensive UHF transmitters as the signals transmitted between sensor nodes of the mesh network only needs to travel as far as the next sensor. Another benefit of using mesh networked sensors is that the network nodes are self-repairing. That is, after each field sensor detects the fire and relays its location ID code, it is likely to be destroyed by the fire because the field sensors described in this specification are not designed to withstand temperatures exceeding 1,472° Fahrenheit. However, mesh networks are able to reroute the lines of communication within the mesh network when, for example, a field sensor node in the mesh network is inoperable, destroyed, or otherwise not detected. In this way, the mesh network repairs itself and its inherent data communication capabilities remain intact.

In some embodiments, an ember trap detector is utilized to detect emerging fires. An ember trap detector or ember trap sensor is useful to detect wildfire risk from a longer distance than thermal signature/IR-based field sensors, which are typically limited to fire detection up to only 100 feet. By contrast, hot embers can travel vast distances, depending on wind conditions and topography in the area, ahead of a fire. As such, the ember track detector provides a powerful mechanism to detect wildfires early on and take proactive fire suppression actions, such as pre-soaking a house will likely end up in the path of a wildfire.

Figure 9:
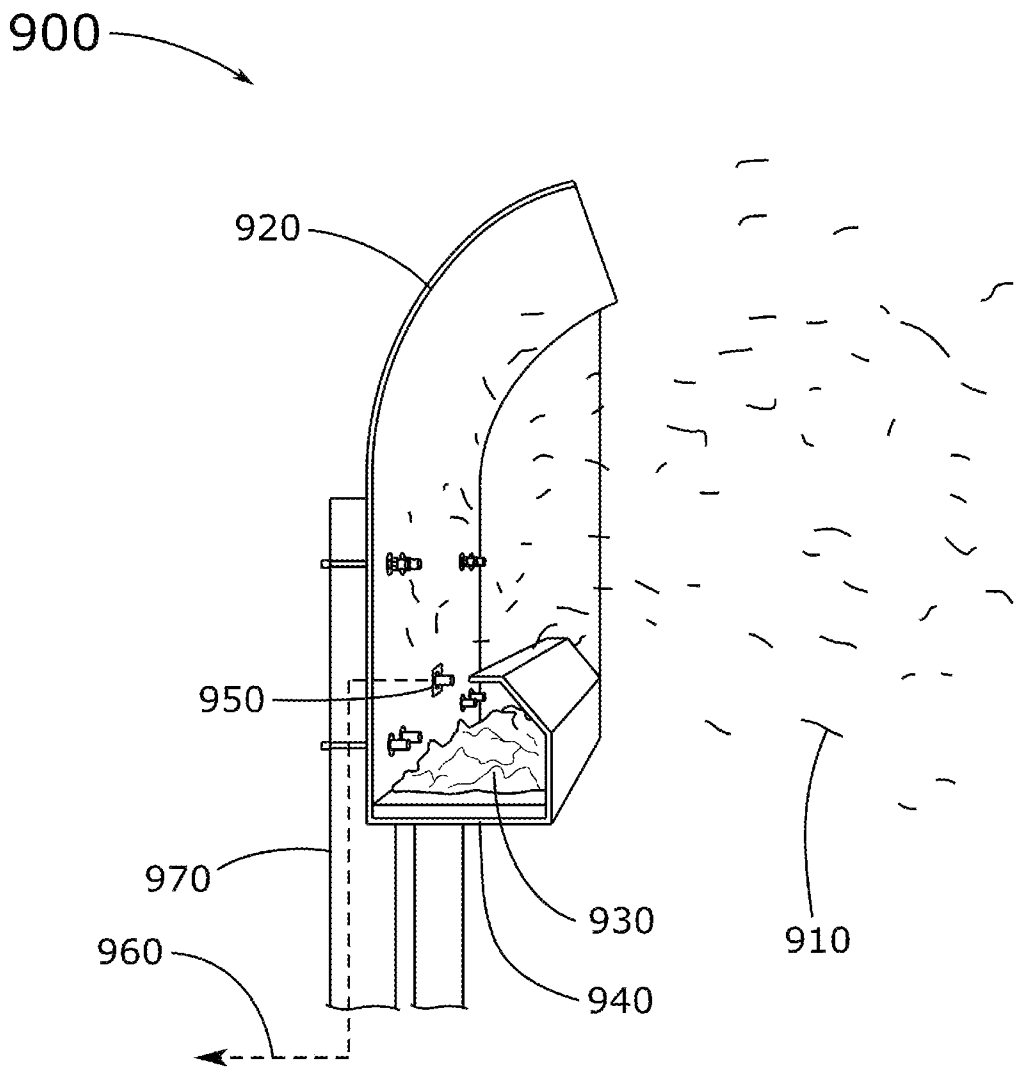
FIG. 9 conceptually illustrates a partial cross-section view of a field ember trap detector in some embodiments.

By way of example, FIG. 9 conceptually illustrates a partial cross-section view of a post-mounted ember trap detector 900 in some embodiments. The post-mounted ember trap detector 900 shown in this figure is designed to passively capture hot wildfire embers 910. As shown, the field ember trap detector 900 includes a field ember trap detector housing 920, a sensor chamber 930, an aeration and combustion chamber 940 with dry combustible water resistant material, a short-range thermal signature/IR temperature sensor 950, an automated mister control line 960, and a mounting post 970. As shown, the post-mounted ember trap detector 900 is mounted, by bolts or other bolt-like mounting fasteners, to the mounting post 970 from within the field ember trap detector housing 920 and into/through the mounting post 970. When the post-mounted ember trap detector 900 is deployed for use, the dry water-resistant combustible materials are contained down to a tray with a heavy steel mesh cover. Examples of dry combustible material used in the aeration and combustion chamber 940 of an ember trap detector include, without limitation, magnesium shavings, cotton, pre-packaged water-resistant fire starter material, fire starter gel packs, steel wool, small dry wood needles, etc. When one or more hot embers are captured, the field ember trap detector housing 920 deflects them down toward the combustible material in the aeration and combustion chamber 940. In the sensor chamber 930, sealed watertight plastic tube with a low temperature melting piece of solder run though it and fill with 25% magnesium shavings, the sensor 950 resides just above and proximate to the combustible material and is configured to melt open in the sensor chamber 930 when the dry combustible materials ignite and burn when the embers are captured. This then triggers and creates an open circuit configuration in the low voltage perimeter ember trap system to start a local water pump relay. When connected by a hard-wired series of ember trap detectors, this open circuit signals to the automatic pump activation system, which is further described below, by reference to FIGS. 17 and 18. In some embodiments, a home automation hub can be trigger remotely by the homeowner via a phone application and start the pump manually. This in conjunction with home security cameras view on, for example, a cell phone application allows the homeowners to remotely turn on and off the suppression system based on conditions they see in their security cameras. In addition, (both of field sensors and other ember trap detectors) in the mesh network. This wireless data signaling is like the process described above with respect to the IR-based field sensors. In some embodiments, an ember trap detector is swivel-mounted or loosely attached to allow wind-based rotation of the ember trap detector, adjusting its position to the direction of the wind and location of incoming embers to optimize ember capture. For example, a windsock style version of the ember trap detector that rotates according to wind direction, or a swivel-mounted ember trap detector that rotates by wind direction like a weather vane.

Figure 10:
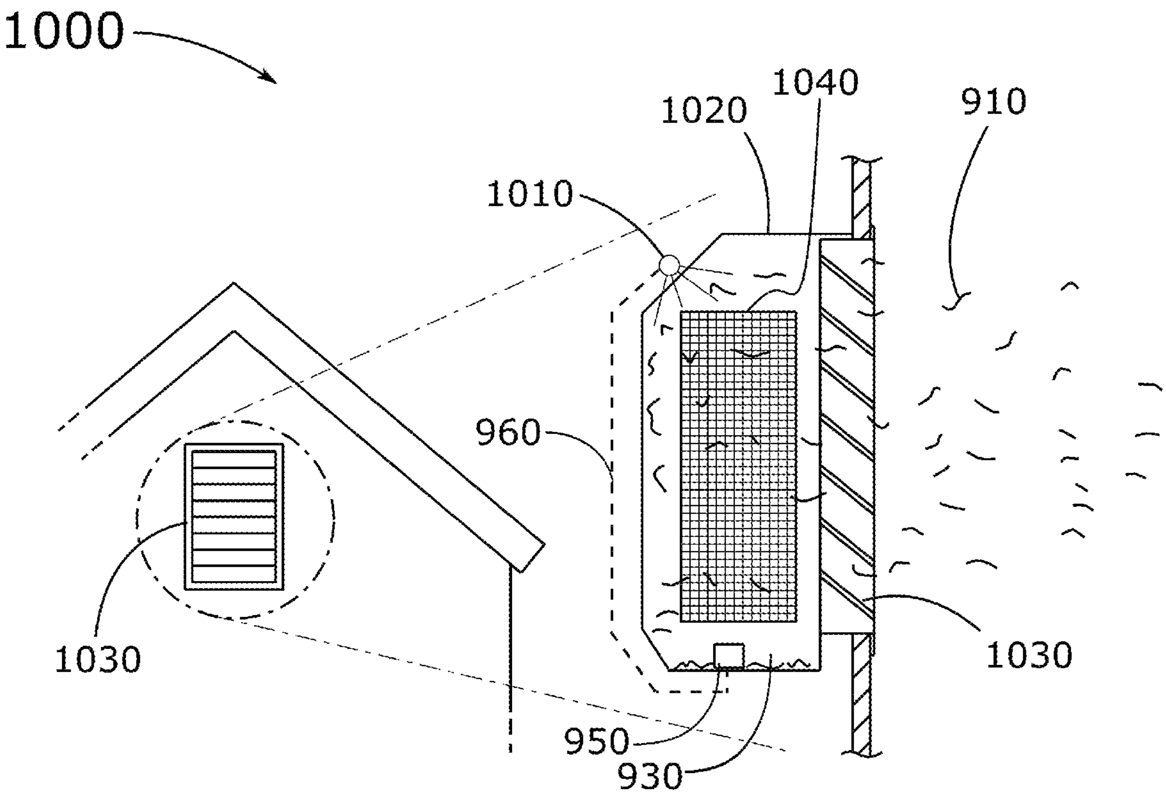
FIG. 10 conceptually illustrates a partial cross-section view of a building vent ember suppressor in some embodiments.
Figure 11:
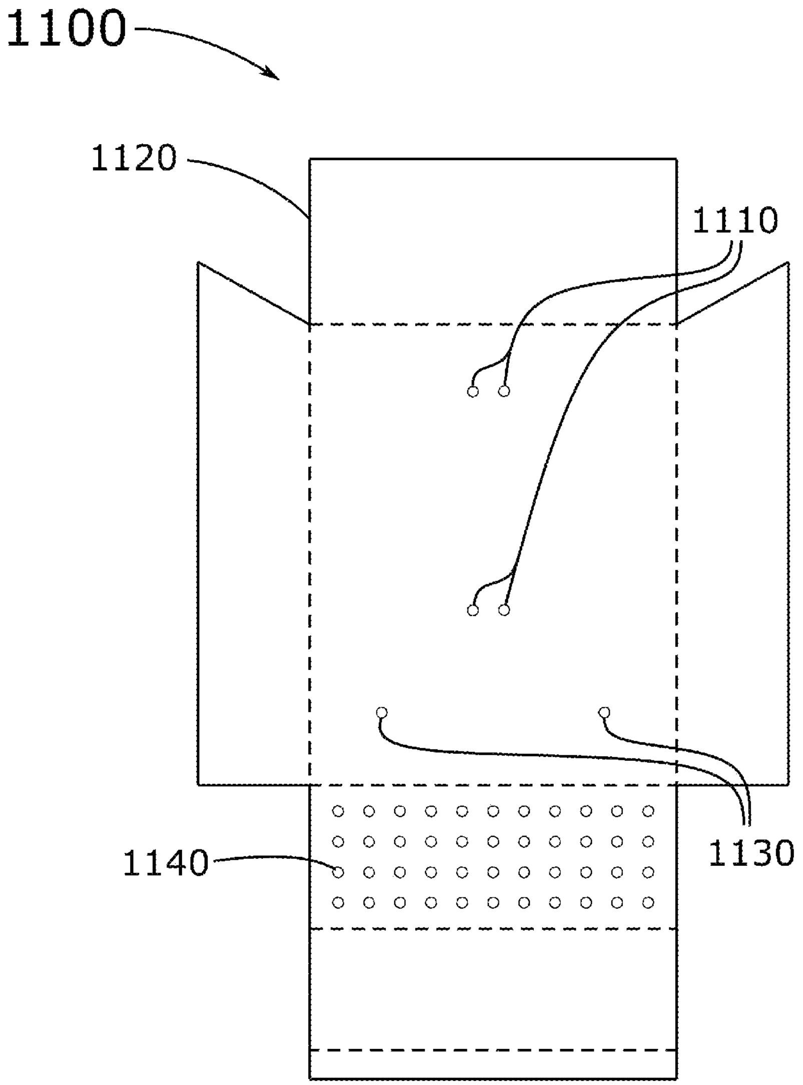
FIG. 11 conceptually illustrates a sheet metal blank of an ember trap detector housing in some embodiments.

By way of another example, FIG. 10 conceptually illustrates a partial cross-section view of a building structure vent ember trap detector and suppressor 1000 in some embodiments. Like the post-mounted ember trap detector 900 described above, by reference to FIG. 9, the building structure vent ember trap detector and suppressor 1000 is designed to passively capture hot wildfire embers 910 that travel through open louvers 1030 into vents of buildings, homes, and other such structures and preventing the embers from burning the structure by simply dying while contained in the building structure vent ember trap detector and suppressor 1000 or by actively misting the embers to prevent fire. Like the post-mounted ember trap detector 900 described above, by reference to FIG. 9, the building structure vent ember trap detector and suppressor 1000 shown in this figure includes the sensor chamber 930, the short range IR temperature sensor 950, and the automated mister control line 960. The building structure vent ember trap detector and suppressor 1000 also includes a chamber mist suppressor water line 1010, a vent ember trap detector and suppressor housing 1020, and an additional fire screen insert 1040, with all components of the building structure vent ember trap detector and suppressor 1000 embedded within the vent, behind the louvers 1030. One difference of the building structure vent ember trap detector and suppressor 1000 compared to the post-mounted ember trap detector 900 described above, by reference to FIG. 9, is that the building structure vent ember trap detector and suppressor 1000 includes the chamber mist suppressor water line 1010, which is triggered to spray water on captured embers that build up into detectable short-range thermal signature/IR levels to prevent fire damage to the building structure. Another difference of the building structure vent ember trap detector and suppressor 1000 compared to the post-mounted ember trap detector 900 described above, by reference to FIG. 9, is that the building structure vent ember trap detector and suppressor 1000 includes the additional fire screen insert 1040 to prevent embers from traveling into attics and other spaces. On the other hand, a fine side of the additional fire screen insert 1040 permits ventilation.

Creating an ember trap detector is described next, by reference to FIGS. 11-14. Specifically, FIG. 11 conceptually illustrates a sheet metal blank 1100 of a post-mounted solar-powered ember trap detector housing in some embodiments. As shown in this figure, the sheet metal blank 1100 includes a plurality of mounting holes 1110 in a post-mounted solar-powered ember trap detector housing 1120. The sheet metal blank 1100 also includes thermal signature sensor holes 1130 and drain and vent holes 1140. Dashed fold lines are shown for construction.

Figure 12:
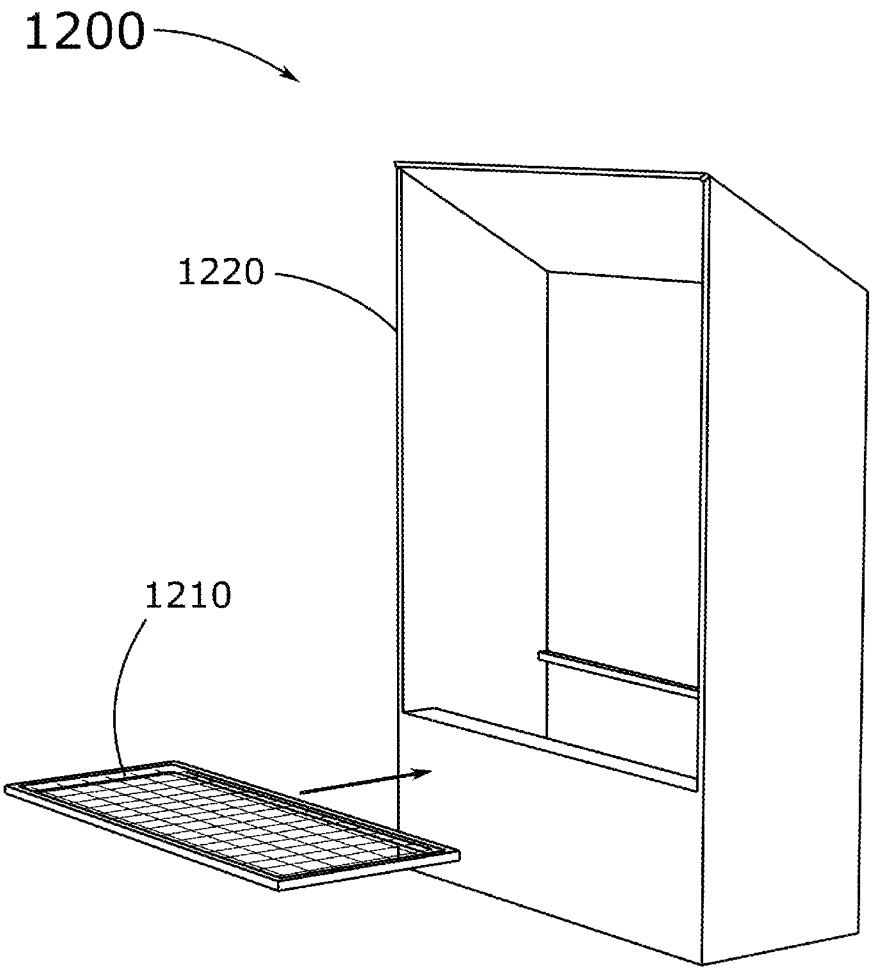
FIG. 12 conceptually illustrates a partially assembled ember trap detector in some embodiments.

Turning to another ember trap construction example, FIG. 12 conceptually illustrates a partially assembled ember trap detector 1200 in some embodiments. The partially assembled ember trap detector 1200 shown in this figure may be a post-mounted solar-powered ember trap detector, a wall-mounted ember trap detector, or another type of ember trap detector. The partially assembled ember trap detector 1200 in this figure has an exterior ember trap detector housing 1220 that is welded together when the flat sheet metal sections are folded over according to the dashed fold lines demonstrated in FIG. 11. While the exterior ember trap detector housing 1220 is similar to the post-mounted solar-powered ember trap detector housing 1120, described above by reference to FIG. 11, the exterior ember trap detector housing 1220 may have differences do to the intended mounting or use of the ember trap detector. For example, the partially assembled ember trap detector 1200 may be intended for wall mounting, post mounting, (top of) fence or ledge mounting, etc. When constructed this way, the partially assembled ember trap detector 1200 may have dimensions of two feet in height, eight inches in depth, and one and a half inches in width. However, as noted above, the ember trap detector is scalable to other sizes suitable for particular applications. Additionally, the partially assembled ember trap detector 1200 shown in this figure includes an animal screen 1210 that fits within the folded or welded exterior ember trap detector housing 1220. The animal screen 1210 for this ember trap detector 1200 includes a mesh grate that is designed to prevent animals from climbing into the aeration chamber of the ember trap detector 1200. The mesh grate of the animal screen 1210 may have a one inch by one inch mesh pattern, so as to prevent all animals larger than one inch by one inch from entering. The animal screen 1210 also prevents other objects from falling into or otherwise entering the area of the ember trap detector 1200 with the combustible material. For example, an RF controller toy helicopter, a baseball or tennis ball that is projected accidentally toward the ember trap detector 1200, etc.

Figure 13:
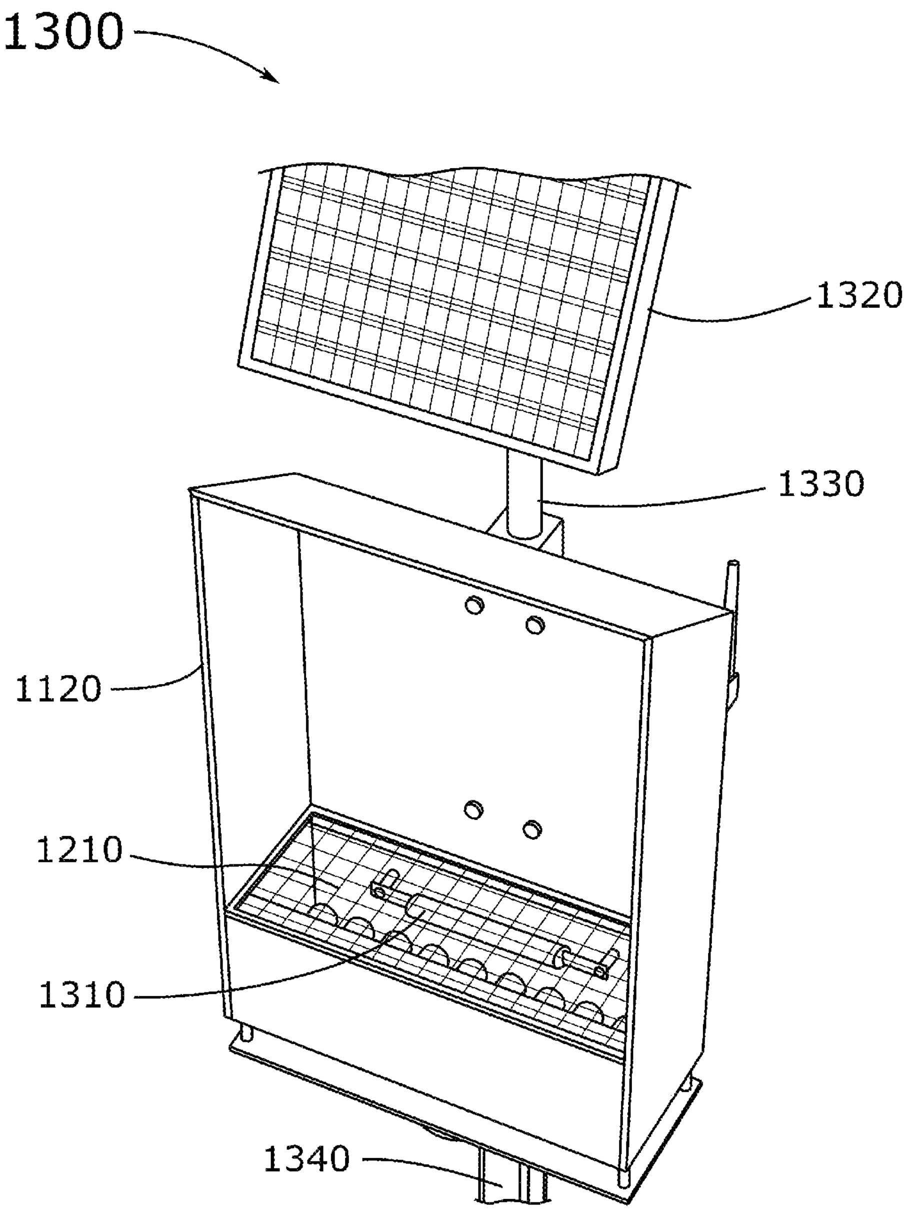
FIG. 13 conceptually illustrates a fully assembled post-mounted solar-powered ember trap detector in some embodiments.

Now referencing another ember trap construction example, FIG. 13 conceptually illustrates a fully assembled post-mounted solar-powered ember trap detector 1300 in some embodiments. As shown in this figure, the fully assembled post-mounted solar-powered ember trap detector 1300 includes the post-mounted solar-powered ember trap detector housing 1120, the animal screen 1210, a thermal signature sensor 1310, a solar panel 1320, a solar panel mast 1330, and a support post 1340. The fully assembled post-mounted solar-powered ember trap detector 1300 is mounted to the support post 1340 by four bolts that are shown within the post-mounted solar-powered ember trap detector housing 1120. The solar panel mast 1330 extends from the top of the support post 1340 upward to secure the solar panel 1320 at a height and orientation intended to maximize sun exposure.

In some embodiments, the thermal signature sensor 1310 is made of a water tight plastic tube with low temperature solder that completes a circuit. The plastic used for the tube has a low melting point of approximately three-hundred degrees Fahrenheit, while deflecting at approximately one-hundred fifty seven degrees Fahrenheit. The tube itself is filled with magnesium for easy ignition. One the tube is destroyed by fire from the ignited combustible material, an open circuit is created which triggers fire suppression and mitigation actions. For example, an open circuit is created to the pump activation unit for perimeter ember trap detectors surrounding a property or building structure. An example of open circuit activation is described below, by reference to FIG. 17. An example of a circuit for pump automated activation by perimeter ember trap detectors is also described below, by reference to FIG. 18.

Figure 14:
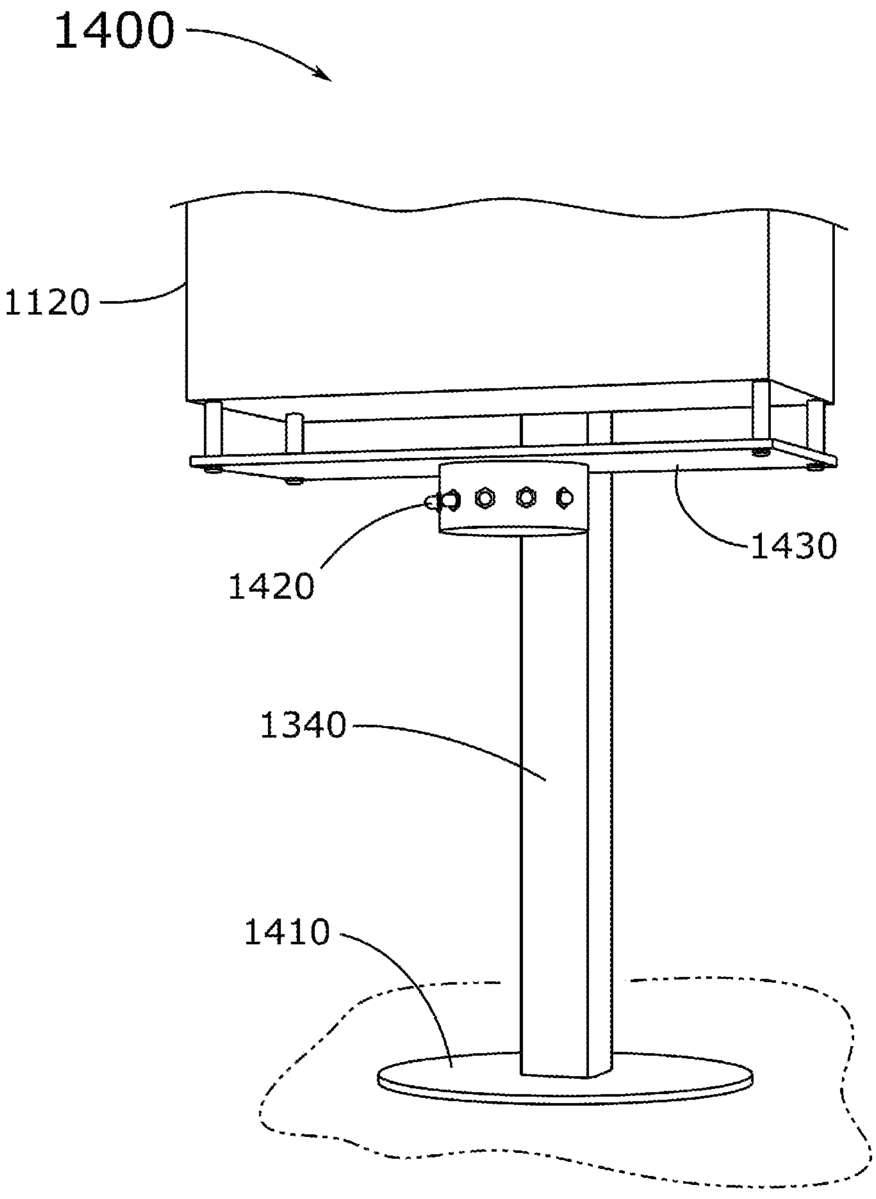
FIG. 14 conceptually illustrates foundation installation of a fully assembled post-mounted ember trap detector in some embodiments.

By way of example, FIG. 14 conceptually illustrates a foundation installation of a fully assembled post-mounted ember trap detector 1400 in some embodiments. As shown, the foundation installation of the fully assembled post-mounted ember trap detector 1400 includes the post-mounted solar-powered ember trap detector housing 1120, the support post 1340, a foundation 1410, an infrared (IR) sensor array 1420, and a sensor rain and debris shield 1430 of the post-mounted ember trap detector 1400. In some embodiments, the foundation 1410 comprises a cement base. In some embodiments, the foundation 1410 is anchored in the ground. In some embodiments, the sensor rain and debris shield 1430 of the post-mounted ember trap detector 1400 blocks rain and debris from the vent holes along the aeration and combustion chamber. In some embodiments, the sensor rain and debris shield 1430 of the post-mounted ember trap detector 1400 also provides a flat surface to which the IR sensor array 1420 is attached. By attaching the sensor rain and debris shield 1430 to the post-mounted solar-powered ember trap detector housing 1120 with a gap between them, the ability to provide airflow for combustion is maximized.

Figure 15:
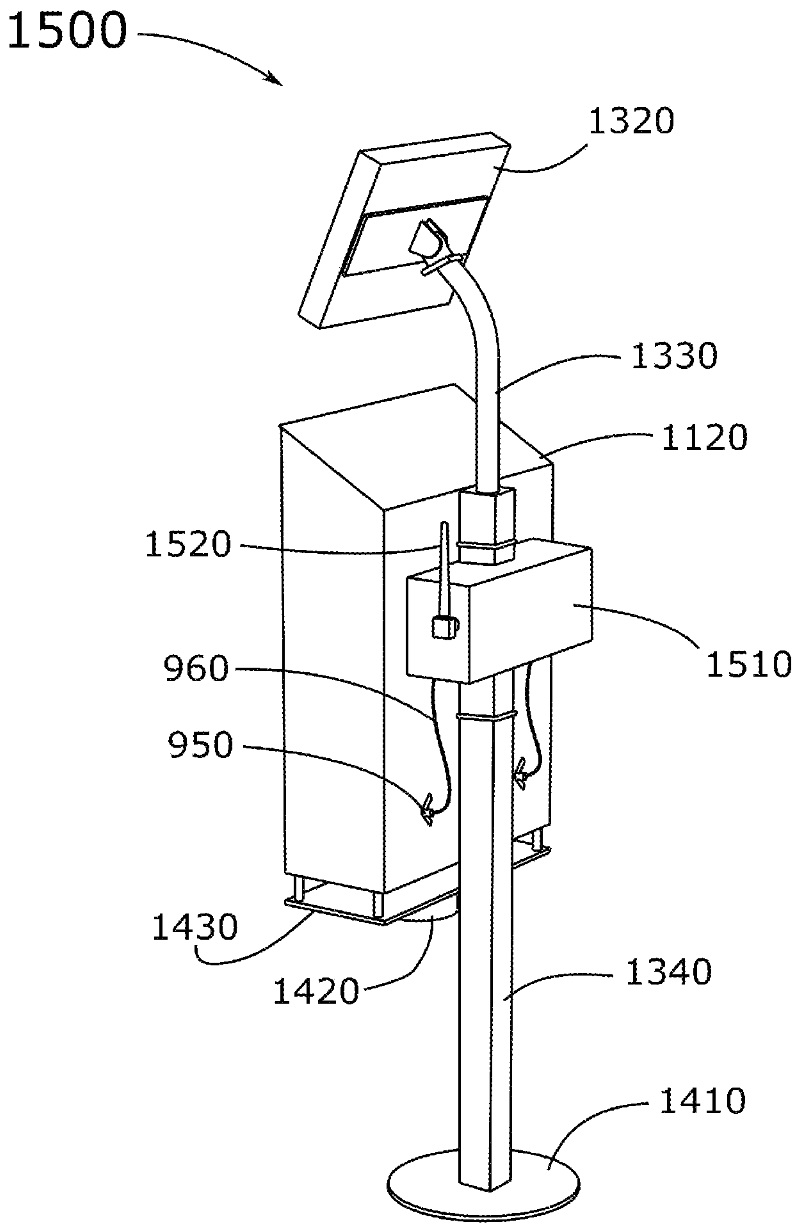
FIG. 15 conceptually illustrates a back side view of a post-mounted solar-powered wireless ember trap detector with attached power source and transmitter in some embodiments.

Now referring to a different view, FIG. 15 conceptually illustrates a back side view of a post-mounted solar-powered wireless ember trap detector 1500 with attached power source and transmitter in some embodiments. As shown in this figure, the post-mounted solar-powered wireless ember trap detector 1500 is comprised of the short range IR temperature sensor 950, the post-mounted solar-powered ember trap detector housing 1120, the solar panel 1320, the solar panel mast 1330, the support post 1340, the foundation 1410, the IR sensor array 1420, the sensor rain and debris shield 1430, a component box 1510, and an antenna 1520. The component box 1510 of the post-mounted solar-powered wireless ember trap detector 1500 includes an off-grid power supply (battery), a battery charge controller, a printed circuit board (PCB) for command and control signaling over control wires, and other components. Details of the component box 1510 are described below, by reference to FIG. 16. The antenna 1520 of the post-mounted solar-powered wireless ember trap detector 1500 comprises a wireless/ultra-high frequency (UHF) short range antenna/transmitter. In some embodiments, the antenna 1520 is also configured to receive commands from an embedded (not shown in this figure) mesh network control. Generally, the use of mesh network signally reduces the need to utilize the more expensive UHF transmitter, as the signal can jump along a series of mesh networked ember trap detector nodes. Nevertheless, a preferred embodiment of the ember trap detector is in a perimeter ember trap detector series that are interconnected by hard wired or wireless connection to each successive ember trap detector which surrounds a property or building structure.

Figure 16:
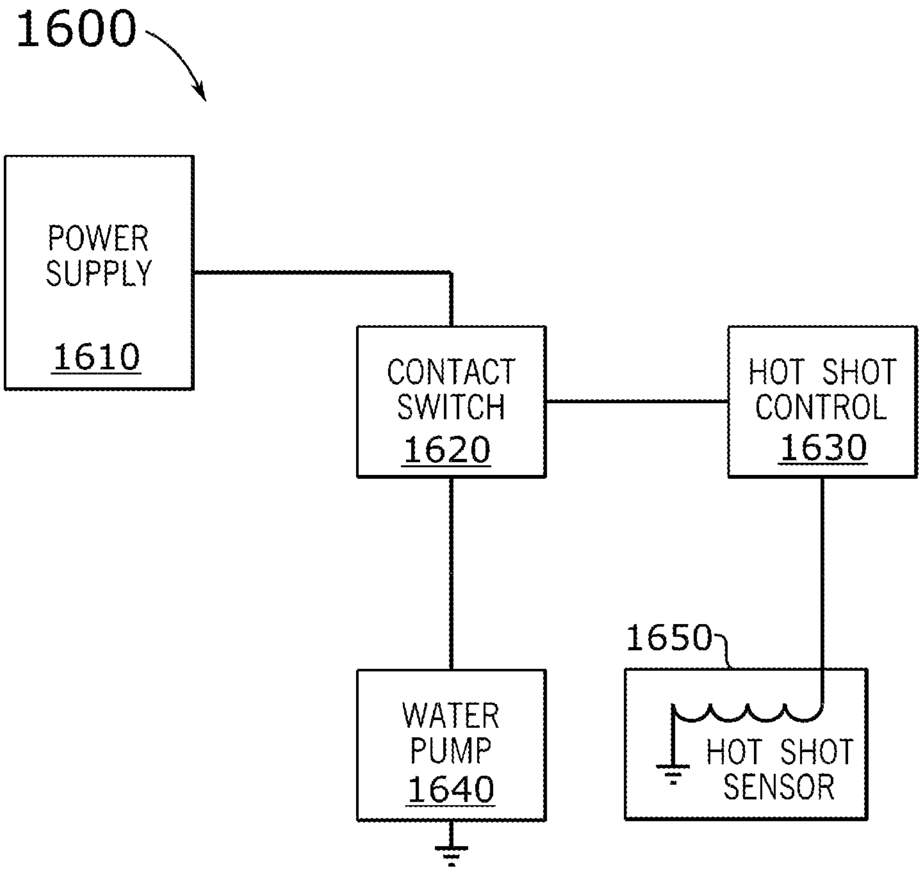
FIG. 16 conceptually illustrates a block diagram of power and control components embedded in the control box of a solar-powered wireless ember trap detector in some embodiments.

By way of reference, FIG. 16 conceptually illustrates a block diagram of power and control components 1600 of a solar-powered wireless ember trap detector in some embodiments. The power and control components 1600 may be embedded in a control box of the solar-powered wireless ember trap detector, such as the control box 1510 of the post-mounted solar-powered wireless ember trap detector 1500 described above by reference to FIG. 15, or a similar control box of a wall-mounted solar-powered wireless ember trap detector. As shown in this figure, the power and control components 1600 of the solar-powered wireless ember trap detector include a power supply 1610, a contact switch 1620, a printed circuit board (PCB) for command and control 1630 signaling over control wires from IR and/or thermal signature sensors 1650, which when triggered, causes a water pump 1640 (or other water supply source) to activate to spray the building structure or other structure being protected from fire. An example of a home perimeter ember sensor automated control and activation system with a water pump that is triggered to activate by validated sensor detection of fire from multiple sensors in a series of post-mounted solar-powered wireless ember trap detectors and wall-mounted solar-powered wireless ember trap detectors is described below, by reference to FIG. 19.

Figure 17:
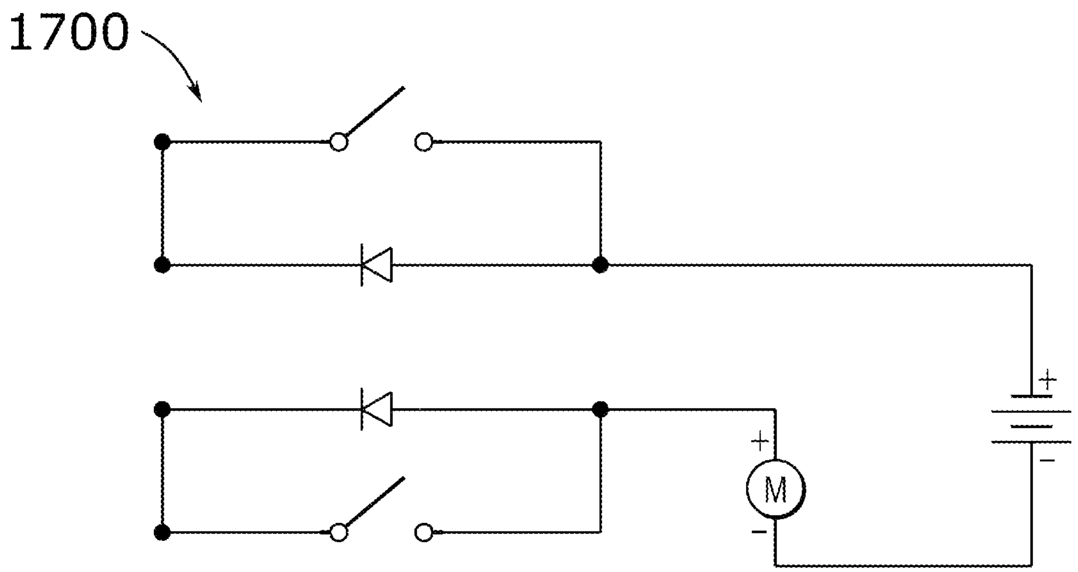
FIG. 17 conceptually illustrates open circuit activation by way of perimeter ember trap detectors of a home perimeter ember sensor automated control and activation system in some embodiments.
Figure 18:
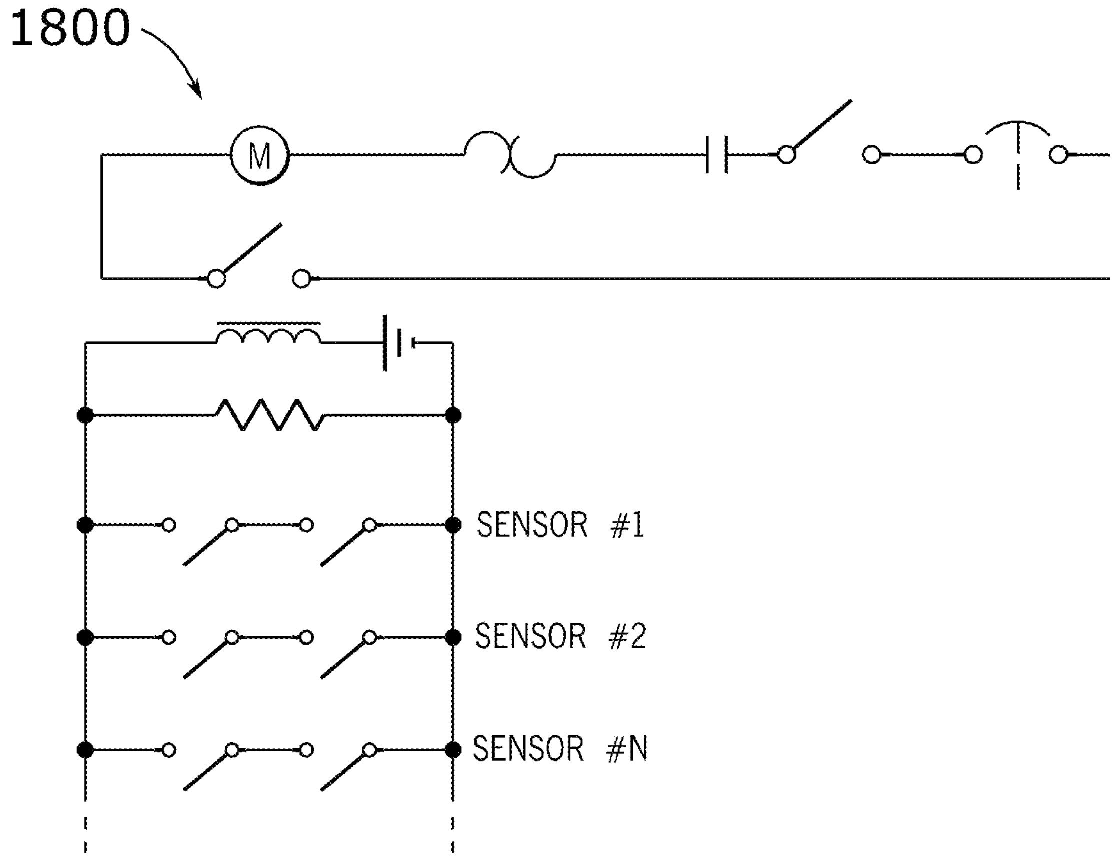
FIG. 18 conceptually illustrate a circuit for pump automated activation by way of perimeter ember trap detectors of a home perimeter ember sensor automated control and activation system in some embodiments.

By way of example, FIG. 17 conceptually illustrates open circuit activation 1700 by way of perimeter ember trap detectors of a home perimeter ember sensor automated control and activation system in some embodiments. Turning to another example, FIG. 18 conceptually illustrate a circuit for pump automated activation 1800 by way of perimeter ember trap detectors of a home perimeter ember sensor automated control and activation system in some embodiments.

Figure 19:
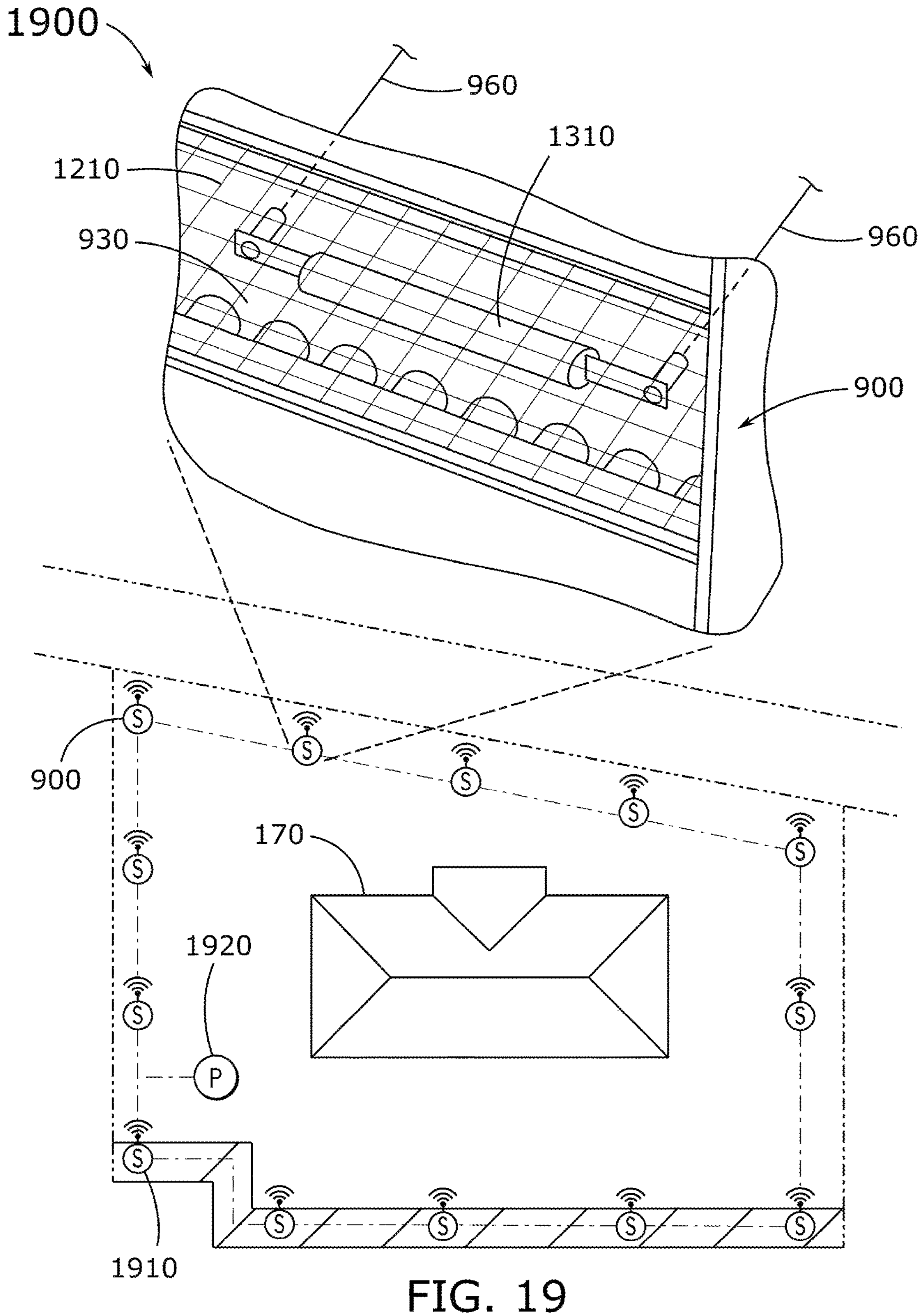
FIG. 19 conceptually illustrates a schematic plan view of a home perimeter hard-wired or wireless ember sensor automated control and activation system in some embodiments.

Now referring to a home perimeter ember sensor control example, FIG. 19 conceptually illustrates a schematic plan view of a home perimeter ember sensor automated control and activation system 1900 in some embodiments. In this figure, the home perimeter ember sensor automated control and activation system 1900 surrounds a building structure 170 of a property with a water pump 1920. Specifically, the home perimeter ember sensor automated control and activation system 1900 includes a plurality of post-mounted ember trap detectors 900 and a plurality of wall-mounted ember trap detectors 1910. Since the plurality of post-mounted ember trap detectors 900 and the plurality of wall-mounted ember trap detectors 1910 surround the building structure 170, a detected fire that is validated causes activation of the water pump 1920. The mechanism for triggering the water pump 1920 activation is shown in close-up detail of a post-mounted ember trap detector 900 (although could have been shown by a wall-mounted ember trap detector 1900). In particular, the close-up detailed view of the post-mounted ember trap detector 900 shows a sensor chamber 930 to control water spray on the building structure 170 when the water pump 1920 is activated, an animal screen 1210, a thermal signature sensor 1310 which, when the plastic tube melts, releases magnesium powder to the captured embers and (likely burning) combustible material to burn at a sufficient temperature for the solder inside the thermal signature sensor 1310 tube to create an open circuit to the water pump 1920. It should be noted the pump and suppression systems can be turned on/off remotely via a phone application using security cameras to gauge the properties proximity to embers or the wildfire.

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the terms "software", "application", "app", and "mobile app" (referred to below as "software") are meant to include firmware residing in read-only memory or applications stored in magnetic storage, which can be read into memory for processing by a processor, such as the processor of a mobile computing device or a mobile communication device, such as a smartphone, a hand-held computing device, or a tablet computing device (referred to simply as a "mobile device"), or the processor of a traditional computing device, such as a server computer, a desktop computer, or a laptop computer (referred to simply as a "computer"). Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 20:
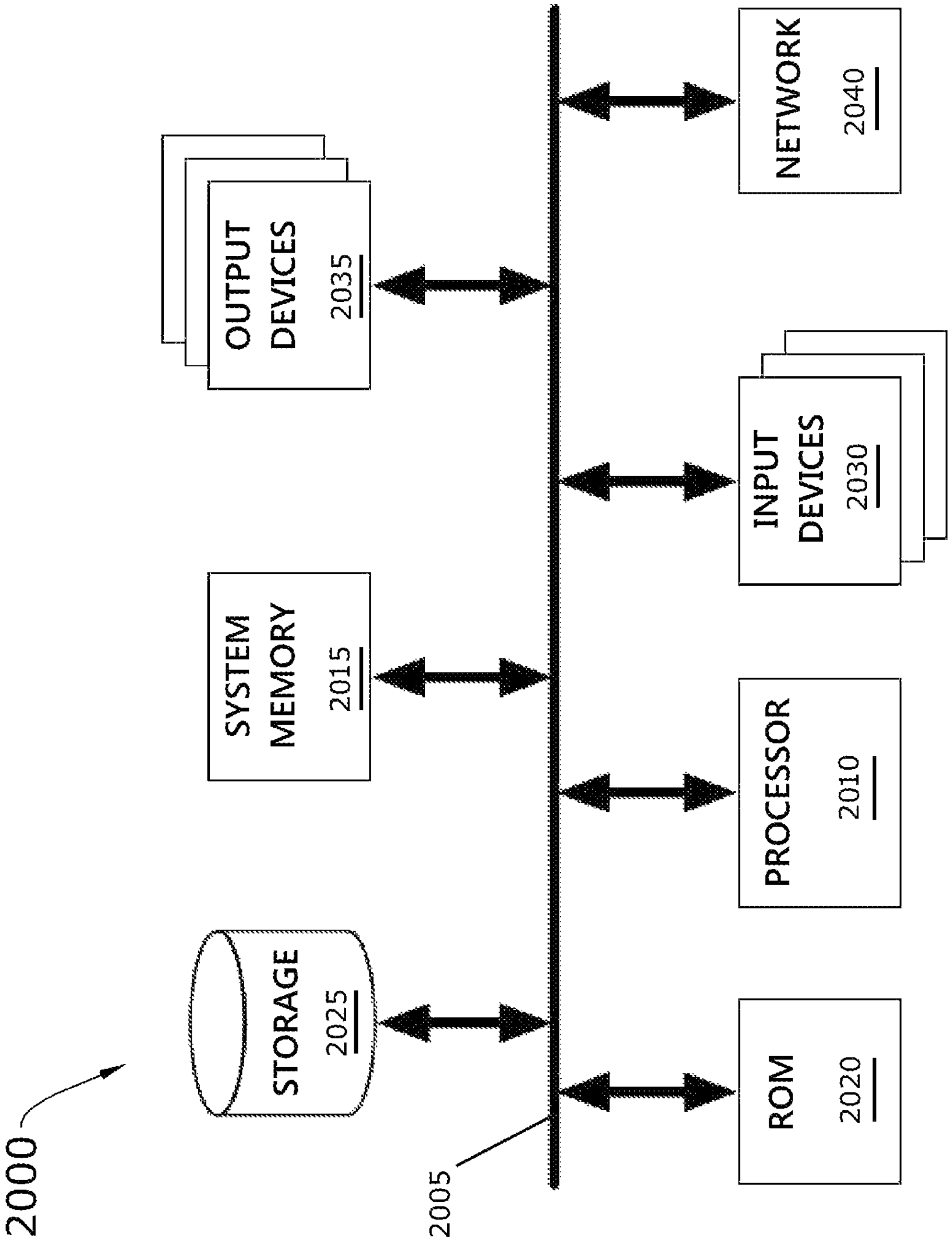
FIG. 20 conceptually illustrates an electronic system with which some embodiments of the invention are implemented.

FIG. 20 conceptually illustrates an electronic system 2000 with which some embodiments of the invention are implemented. The electronic system 2000 may be a computer, server computing device, a mobile device, a tablet computing device, a phone, multiple distributed computing devices that execute as a coordinated unit, or any other sort of bare metal electronic device or a virtual machine or a combination of modules that execute as a related unit under a virtual machine implementation of an electronic system. Such an electronic system includes various types of computer readable media and interfaces for various other types of computer readable media. Electronic system 2000 includes a bus 2005, processing unit(s) 2010, a system memory 2015, a read-only memory 2020, a permanent storage device 2025, input devices 2030, output devices 2035, and a network 2040.

The bus 2005 collectively represents all system, peripheral, and chipset buses that communicatively connect the numerous internal devices of the electronic system 2000. For instance, the bus 2005 communicatively connects the processing unit(s) 2010 with the read-only memory 2020, the system memory 2015, and the permanent storage device 2025.

From these various memory units, the processing unit(s) 2010 retrieves instructions to execute and data to process in order to execute the processes of the invention. The processing unit(s) may be a single processor or a multi-core processor in different embodiments.

The read-only-memory (ROM) 2020 stores static data and instructions that are needed by the processing unit(s) 2010 and other modules of the electronic system. The permanent storage device 2025, on the other hand, is a read-and-write memory device. This device is a non-volatile memory unit that stores instructions and data even when the electronic system 2000 is off. Some embodiments of the invention use a mass-storage device (such as a magnetic or optical disk and its corresponding disk drive) as the permanent storage device 2025.

Other embodiments use a removable storage device (such as a flash drive) as the permanent storage device 2025. Like the permanent storage device 2025, the system memory 2015 is a read-and-write memory device. However, unlike storage device 2025, the system memory 2015 is a volatile read-and-write memory, such as a random access memory. The system memory 2015 stores some of the instructions and data that the processor needs at runtime. In some embodiments, the invention's processes are stored in the system memory 2015, the permanent storage device 2025, and/or the read-only memory 2020. For example, the various memory units include instructions for processing sensor-based wildfire location data transmitted over a mesh network and processed by custom designed Hotshot smart software applications in connection with one or more algorithms and AI and machine-learning modules and systems. From these various memory units, the processing unit(s) 2010 retrieves instructions to execute and data to process in order to execute the processes of some embodiments.

The bus 2005 also connects to the input and output devices 2030 and 2035. The input devices enable the user to communicate information and select commands to the electronic system. The input devices 2030 include alphanumeric keyboards and pointing devices (also called "cursor control devices"), including both physical hardware keyboards and devices and virtual, screen-based keyboards and devices, audio-based input systems, or other such input devices 2030. The output devices 2035 display textual information and images generated by the electronic system 2000, such as the real-time accurate 3D vector-based map that shows active fires and provides predictive views of fire movement in real-time. The output devices 2035 include printers and display devices, such as liquid crystal displays (LCD) and organic light emitting diode (OLED) displays. Some embodiments include devices such as a touchscreen that functions as both input and output devices.

Finally, as shown in FIG. 20, bus 2005 also couples electronic system 2000 to a network 2040 through a network adapter (not shown), such as a mesh network adapter, a mesh network controller, or other network communications adapter, device, or module. In this manner, the computer can be a part of a redundant self-repairable network of computers (such as a local area network ("LAN"), a wide area network ("WAN"), an intranet, a mesh network), or a network of networks (such as the Internet or multiple mesh networks that are communicably connected by way of a common parent node device, such as a server computing device).

The functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIG. 4 conceptually illustrates a process in which the specific operations of the process may not be performed in the exact order shown and described. Specific operations may not be performed in one continuous series of operations, and different specific operations may be performed in different embodiments. Furthermore, the process could be implemented using several sub-processes, or as part of a larger macro process. Also, the intelligent automated community wildfire detection and suppression control system, the ember trap detector, and/or the home perimeter ember sensor automated control and activation system can be adapted for different implementations and/or deployments. Specifically, the components of the intelligent automated community wildfire detection and suppression control system, the ember trap detector, and/or the home perimeter ember sensor automated control and activation system can be reorganized to detect and suppress fire situations that are not wildfires. For instance, adapting the intelligent automated community wildfire detection and suppression control system, the ember trap detector, and/or the home perimeter ember sensor automated control and activation system for use to detect and suppress oil refinery fires or fires that occur from an atomic blast and its aftermath. Thus, one of ordinary skill in the art would understand that the invention is not to be limited by the foregoing illustrative details, but rather is to be defined by the appended claims.

We claim:

1. An intelligent automated community wildfire detection and suppression control system comprising:

a wireless mesh network;

a plurality of off-grid, solar-powered field sensors that are configured to detect a thermal signature from a wildfire in an area of varying topography and transmit a wireless signal over the wireless mesh network;

a plurality of fire suppressor devices applied to a plurality of building structures in the area, each building structure having one or more fire suppressor devices configured to spray water on the building structure when a detected fire puts the building structure at risk;

an off-grid, self-powered system control house that is communicably connected to the plurality of off-grid, solar-powered field sensors over the mesh network, wherein the system control house comprises an intelligent fire suppression server, a transmitter-receiver, a satellite modem, an off-grid power source, and fire suppression hardware, wherein the intelligent fire suppression server comprises smart control software that is configured to calculate velocity and direction vectors based on fused field sensor data and is further configured to generate a three-dimensional (3D) real-time map of the wildfire with future predicted wildfire movement paths, wherein the intelligent fire suppression server transmits the 3D real-time map and an alert warning level to home owners in the area and at least one fire department servicing the area; and an off-grid primary additional water supply source that is configured to provide a primary additional water supply to the fire suppressor devices of the building structures to suppress wildfires and protect the building structures when a city main water line is detected to have low water pressure.

2. The intelligent automated community wildfire detection and suppression control system of claim 1, wherein each field sensor in the plurality of off-grid, solar-powered field sensors comprises a 360° field of view infrared (IR)/thermal signature sensor array, a transmitter-receiver antenna, a mesh network controller, a solar panel cap, a battery charge controller, a rechargeable battery, a sun rim, and an earth ground screw for stable in-ground installation.

3. The intelligent automated community wildfire detection and suppression control system of claim 2, wherein each field sensor in the plurality of off-grid, solar-powered field sensors is associated with a particular location ID code that uniquely identifies an installation location of the field sensor by an altitude data value and GPS location data comprising a latitude value and a longitude value.

4. The intelligent automated community wildfire detection and suppression control system of claim 3, wherein each field sensor in the plurality of off-grid, solar-powered field sensors is individually activated upon thermal signature/IR detection of a fire by the field sensor, wherein the field sensor transmits the particular location ID code associated with the field sensor to a nearby device configured as a node of the mesh network upon detection of the fire.

5. The intelligent automated community wildfire detection and suppression control system of claim 4, wherein the field sensor is a first particular field sensor, wherein the nearby device configured as a node of the mesh network comprises a second particular field sensor that is nearby the first particular field sensor, wherein the second particular field sensor automatically transmits the particular location ID code to a next nearby device configured as a node of the mesh network.

6. The intelligent automated community wildfire detection and suppression control system of claim 5, wherein the next nearby device configured as a node of the mesh network comprises an intelligent fire suppression server of the system control house.

7. The intelligent automated community wildfire detection and suppression control system of claim 6, wherein the intelligent fire suppression server comprises smart control software that analyzes the particular location ID code and other location ID codes received from other field sensors in the plurality of off-grid, solar-powered field sensors that have detected the wildfire, wherein the smart control software calculates velocity and direction vectors that enable wildfire movement predictions.

8. The intelligent automated community wildfire detection and suppression control system of claim 1, wherein the fire suppression hardware comprises at least one smart variable flow volume and ON/OFF activation water solenoid valve.

9. The intelligent automated community wildfire detection and suppression control system of claim 8, wherein the smart variable flow volume and ON/OFF activation water solenoid valve is part of an activation system for city water supply that triggers the smart variable flow volume and ON/OFF activation water solenoid valve to open a backup water supply to flow to a particular building structure under threat of fire.

10. The intelligent automated community wildfire detection and suppression control system of claim 9 further comprising an intelligent water cannon equipped with an IR sensor that detects when part of a structure is on fire and focuses the water cannon spray on a burning part of the structure for an extended period of time to quench larger flames on the structure.

* * * * *